United States Patent
Babich et al.

(10) Patent No.: US 11,876,653 B2
(45) Date of Patent: *Jan. 16, 2024

(54) LOW-LATENCY CHANNEL EQUALIZATION USING A SECONDARY CHANNEL

(71) Applicant: Skywave Networks LLC, Chicago, IL (US)

(72) Inventors: Kevin J. Babich, Valparaiso, IN (US); Terry Lee Vishloff, Anmore (CA); Danie J. van Wyk, Pretoria (ZA)

(73) Assignee: Skywave Networks LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,294

(22) Filed: May 6, 2022

(65) Prior Publication Data
US 2023/0085690 A1 Mar. 23, 2023

Related U.S. Application Data

(63) Continuation of application No. 15/929,163, filed on Nov. 14, 2019, now Pat. No. 11,343,126.
(Continued)

(51) Int. Cl.
*H04W 4/00* (2018.01)
*H04L 27/01* (2006.01)
(Continued)

(52) U.S. Cl.
CPC .......... *H04L 27/01* (2013.01); *G06Q 40/04* (2013.01); *H04L 1/0003* (2013.01); *H04W 88/14* (2013.01)

(58) Field of Classification Search
CPC ...... H04B 7/005; G06Q 40/04; H04L 1/0003; H04L 25/03038; H04L 27/01; H04L 2025/03751; H04W 88/14
See application file for complete search history.

(56) References Cited

U.S. PATENT DOCUMENTS 5,995,518 A * 11/1999 Burns .............. H04N 21/43072
370/252
8,121,185 B2 2/2012 Cohen
(Continued)

FOREIGN PATENT DOCUMENTS

| EP | 3698501 A2 | 8/2020 |
|----|------------|--------|
| KR | 20080087159 A | 9/2008 |
| WO | 2016094392 A1 | 6/2016 |

OTHER PUBLICATIONS

Arikan, Toros, Thesis—Minimum-Delay HF Communications, University of Illinois at Urbana-Champaign Retrieved from the Internet: https://www.ideals.illinois.edu/bitstream/handle/2142/97507/ARIKAN-THESIS-2017.pdf?sequence=1, 60 pages, Nov. 28, 2017.
(Continued)

*Primary Examiner* — Frank Duong
(74) *Attorney, Agent, or Firm* — Woodard, Emhardt, Henry, Reeves & Wagner, LLP

(57) ABSTRACT

An equalization method has been developed for low latency, low bandwidth wireless communication channel environments. With this method, an exact copy, nearly exact copy, or some facsimile of a message (or associated information), which was transmitted via a low latency, low bandwidth wireless communication channel, is also sent via a backend communication channel such as a fiber optic network. Equalization is generally performed by comparing the originally received message to the copy sent via the backend channel. The original message can incorporate an added channel delay to compensate for the time delay between the primary wireless channel and the backend channel.

23 Claims, 11 Drawing Sheets

Related U.S. Application Data

(60) Provisional application No. 62/767,216, filed on Nov. 14, 2018.

(51) Int. Cl.
*G06Q 40/04* (2012.01)
*H04L 1/00* (2006.01)
*H04W 88/14* (2009.01)

(56) References Cited

U.S. PATENT DOCUMENTS

| | | | |
|---|---|---|---|
| 8,824,442 B2* | 9/2014 | Lea | H04W 88/08 455/562.1 |
| 9,136,938 B1 | 9/2015 | Babich | |
| 9,210,006 B2 | 12/2015 | Balraj et al. | |
| 9,553,745 B2 | 1/2017 | Zerbe et al. | |
| 9,941,950 B2 | 4/2018 | Babich | |
| 2005/0201454 A1 | 9/2005 | Chaudhuri et al. | |
| 2010/0034253 A1 | 2/2010 | Cohen | |
| 2013/0329840 A1 | 12/2013 | Lomp | |
| 2014/0086588 A1 | 3/2014 | Kawanishi et al. | |
| 2015/0101003 A1* | 4/2015 | Bull | H04N 19/147 725/116 |
| 2016/0197559 A1 | 7/2016 | Tan et al. | |
| 2016/0197669 A1 | 7/2016 | Babich | |
| 2017/0230100 A1 | 8/2017 | Babich | |
| 2020/0244352 A1 | 7/2020 | Babich | |
| 2020/0328841 A1 | 10/2020 | Babich et al. | |
| 2020/0328844 A1 | 10/2020 | Babich et al. | |
| 2020/0328918 A1 | 10/2020 | Babich et al. | |
| 2020/0366367 A1 | 11/2020 | Babich | |
| 2021/0058150 A1 | 2/2021 | Babich | |
| 2021/0058151 A1 | 2/2021 | Babich | |
| 2021/0067239 A1 | 3/2021 | Babich | |
| 2021/0075494 A1 | 3/2021 | Babich | |
| 2021/0075502 A1 | 3/2021 | Babich | |
| 2021/0075562 A1 | 3/2021 | Babich | |
| 2021/0075584 A1 | 3/2021 | Babich | |
| 2021/0105044 A1 | 4/2021 | Babich | |

OTHER PUBLICATIONS

PCT, Intl. App. No. PCT/US2019/070007 International Search Report, 4 pages, dated May 20, 2020.
PCT, Intl. App. No. PCT/US2019/070007 Written Opinion of the International Search Authority, 8 pages, dated May 20, 2020.
EP, EP App. No. 19884714.7 Extended European Search Report, 12 pages, dated Jul. 15, 2022.

* cited by examiner

Table 1 - Estimated Impairment due to Secondary Channel Relative Delay

| Channel Character | | 50 mSec extra Fiber Delay | | 10 mSec extra Fiber Delay | |
|---|---|---|---|---|---|
| | Doppler | Fraction Ch. Coherence | Penalty at 30 dB SNR | Fraction Ch. Coherence | Penalty at 30 dB SNR |
| Calm | 0.1 Hz | .5% | ≈1 dB | .1% | <1 dB |
| Moderate | 0.5 Hz | 2.5% | ≈3 dB | .5% | ≈1 dB |
| Disturbed | 1 Hz | 5% | ≈9 dB | 1% | ≈2 dB |

*Fig. 5*

Table 2 - ITU HF Channel Profiles Scaled to Symbol Rate

| Channel Character | | | 8 KSPS Scaling | | | |
|---|---|---|---|---|---|---|
| | Delay Spread | Doppler Spread | Coherence Time $^2$ | Coherence Time (sym) | Delay Spread | Doppler Spread (sym/sym) |
| Calm | 0.5 ms | 0.1 Hz | 4.23 sec | 33,840 | 4 symbols | $1.25 \cdot 10^{-5}$ |
| Moderate | 1.0 ms | 0.5 Hz | .846 sec | 6,768 | 8 symbols | $6.25 \cdot 10^{-5}$ |
| Disturbed | 2.0 ms | 1 Hz | 0.423 sec | 3,384 | 16 symbols | $1.25 \cdot 10^{-4}$ |

*Fig. 6*

LOW-LATENCY CHANNEL EQUALIZATION USING A SECONDARY CHANNEL

CROSS REFERENCE TO RELATED APPLICATIONS

This application is a continuation of U.S. patent application Ser. No. 15/929,163, filed Nov. 14, 2019, which is hereby incorporated by reference. U.S. patent application Ser. No. 15/929,163, filed Nov. 14, 2019, claims the benefit of U.S. Patent Application No. 62/767,216, filed Nov. 14, 2018, which are hereby incorporated by reference.

BACKGROUND

Typical over the air (OTA) radio transmissions can have significant latencies when transmitted over long distances such as across oceans. Moreover, these transmission channels can be rather noisy which in turn increases the need for error correction. High frequency (HF) radio communication channels of most long-distance communication systems are limited by the available assigned radio bandwidth and channel capacity at any given time. When using the HF radio channel in a financial high-frequency trading application, this limited bandwidth can cause delays in the receipt of financial instructions which in turn can be financially detrimental. Equalizing radio signals containing these instructions can be difficult and time consuming.

Thus, there is a need for improvement in this field.

SUMMARY

A unique method for equalizing a wireless communication channels or other channels has been developed for low latency, low bandwidth wireless communication channel environments.

Wireless channels introduce a variety of impairments including echoes, frequency selectivity, frequency shift (due to doppler) and delay spread each of which will reduce the reliability of correctly receiving the signal. To combat these effects, many digital communication systems use some form of equalizer in order to reduce the undesirable effects of radio channel induced impairments. These solutions take the form of equalizing filters which attempt to correct time and/or frequency distortions. Such filters may be analog or digital in nature. Common techniques include sending pilot tones, sending pilot symbols, and using blind equalization. Each of these may be used in combination with the others or may be used on their own. The use of the above and related techniques is often referred to as equalization. The purpose of a RF channel equalizer in a digital demodulator is to reduce inter-symbol interference (ISI) caused by channel distortions and echoes so that data may be decoded more reliably (i.e. at a lower symbol error rate).

It was discovered that all three of these techniques are not optimally suited skywave radio systems that have low latency but also low bandwidth. The low latency of these systems are helpful with high-speed financial trading, especially between remote, overseas financial markets, but with the low bandwidth, message data is at a premium. Equalization by sending pilot tones or symbols consumes valuable radio resources in order to fit the overhead added to the transmitted data. With blind equalization, the general knowledge of the nature of the data and symbols being transmitted is used to provide error estimates as an input to the equalization algorithms. For example, in a quadrature phase shift keying (QPSK) system each symbol would ideally be at one of four specific points in the modulation constellation during the center of a symbol time. In a low-error-ratio environment, each decision has a high probability of being correct with errors typically of a few percent or less. Thus, even when no independent reference signal is added to the signal, the transmitted signal can be inferred from the received data, because the transmitted signal is limited a specific number of values in a modulation constellation. The challenge for blind equalization is convergence time. Convergence time for blind equalization may not be rapid enough for use in many radio channels.

The equalization technique described herein addresses the shortcomings of these different equalization methods mentioned above by sending an exact copy, nearly exact copy, or some facsimile of the transmitted message (or associated information) via a backend communication channel such as a fiber optic network. Equalization is generally performed by comparing the originally received message to the copy sent via the backend channel. The original message can incorporate an added channel delay to compensate for the time delay between the primary and backend channels.

In one example, the method is used to equalize a high frequency (HF) radio channel by transmitting a duplicate or representative copy of the waveform transmitted over the HF radio channel via a second or backend communication channel, such as a fiber-optic communications system, where the received HF signal may be additionally delayed in order to establish the best case equalizer performance. An identical second equalizer is allowed to converge when the HF receive signal is not additionally delayed or delayed only to the amount that the combined system meets the required timing performance. The difference between the converged tap values of the two equalizers are combined to create a metric which is used as an index into a table to select the desired modulation and coding method to be used over the HF radio channel. The converged tap values can further be used as an index to a table to select the desired modulation and coding method to be used over the HF radio channel. An acceptable delay between the HF and backend channels is determined based on the timing constraints of a high frequency trading system. The acceptable additional delay of HF radio channel is determined in part by the nature of the HF radio channel with benign channels supporting higher modulation formats and in turn less serialization delay. Another example concerns a technique for reducing the delay of a time domain equalizer by evaluating the effect of removing feed forward delay stages. A further example concerns a method for using a slower secondary channel for overhead signaling, link control, alarm reporting, configuration control and/or other system management functions without consuming communications capacity on the lower delay, HF radio channel.

The system and techniques as described and illustrated herein concern a number of unique and inventive aspects. Some, but by no means all, of these unique aspects are summarized below.

Aspect 1 generally concerns a method that includes receiving a signal over a primary communication channel.

Aspect 2 generally concerns the method of any previous aspect which includes receiving at least a representative copy of the signal over a backend communication channel.

Aspect 3 generally concerns the method of any previous aspect which includes equalizing the primary communication channel with a first equalizer by comparing the signal with the representative copy.

Aspect 4 generally concerns the method of any previous aspect which includes establishing a best case performance of the equalizer by delaying the signal by a delay during the equalizing.

Aspect 5 generally concerns the method of any previous aspect in which the primary communication channel includes a high frequency radio channel.

Aspect 6 generally concerns the method of any previous aspect in which the primary communication channel includes a low bandwidth, low latency communication link.

Aspect 7 generally concerns the method of any previous aspect in which the backend communication channel includes a fiber optic network.

Aspect 8 generally concerns the method of any previous aspect in which the representative copy includes an exact copy of the signal.

Aspect 9 generally concerns the method of any previous aspect in which the representative copy includes characteristic information of the signal.

Aspect 10 generally concerns the method of any previous aspect which includes determining a timing performance for the primary communication channel.

Aspect 11 generally concerns the method of any previous aspect in which the timing performance includes a minimum time delay.

Aspect 12 generally concerns the method of any previous aspect which includes determining the minimum time delay at least based on a nature of the primary channel.

Aspect 13 generally concerns the method of any previous aspect which includes changing to a higher modulation format when the nature of the primary channel is benign.

Aspect 14 generally concerns the method of any previous aspect which includes determining the minimum time delay based on jitter of a financial market.

Aspect 15 generally concerns the method of any previous aspect in which the financial market includes a high frequency trading system.

Aspect 16 generally concerns the method of any previous aspect which includes converging a second equalizer with the first equalizer.

Aspect 17 generally concerns the method of any previous aspect in which the second equalizer is identical to the first equalizer.

Aspect 18 generally concerns the method of any previous aspect in which the converging occurs in response to the second equalizer at least satisfying the timing performance.

Aspect 19 generally concerns the method of any previous aspect in which the converging occurs in response to the signal not being additionally delayed.

Aspect 20 generally concerns the method of any previous aspect in which the converging tap values of the first equalizer and the second equalizer.

Aspect 21 generally concerns the method of any previous aspect which includes combining the tap values of the first equalizer and the second equalizer to create a metric.

Aspect 22 generally concerns the method of any previous aspect which includes selecting a modulation and coding method based on the metric.

Aspect 23 generally concerns the method of any previous aspect which includes indexing the modulation and coding method based on the metric.

Aspect 24 generally concerns the method of any previous aspect which includes reducing a time domain for the first equalizer by evaluating an effect of removing feed forward delay stages.

Aspect 25 generally concerns a system for performing the method of any previous aspect.

Further forms, objects, features, aspects, benefits, advantages, and embodiments of the present invention will become apparent from a detailed description and drawings provided herewith.

BRIEF DESCRIPTION OF THE DRAWINGS

FIG. 5 is a table of estimated equalization impairments due to backend channel relative delay.

FIG. 6 is a table of International Telecommunication Union (ITU) high frequency profiles scaled to symbol rate.

DETAILED DESCRIPTION OF SELECTED EMBODIMENTS

Figure 1:
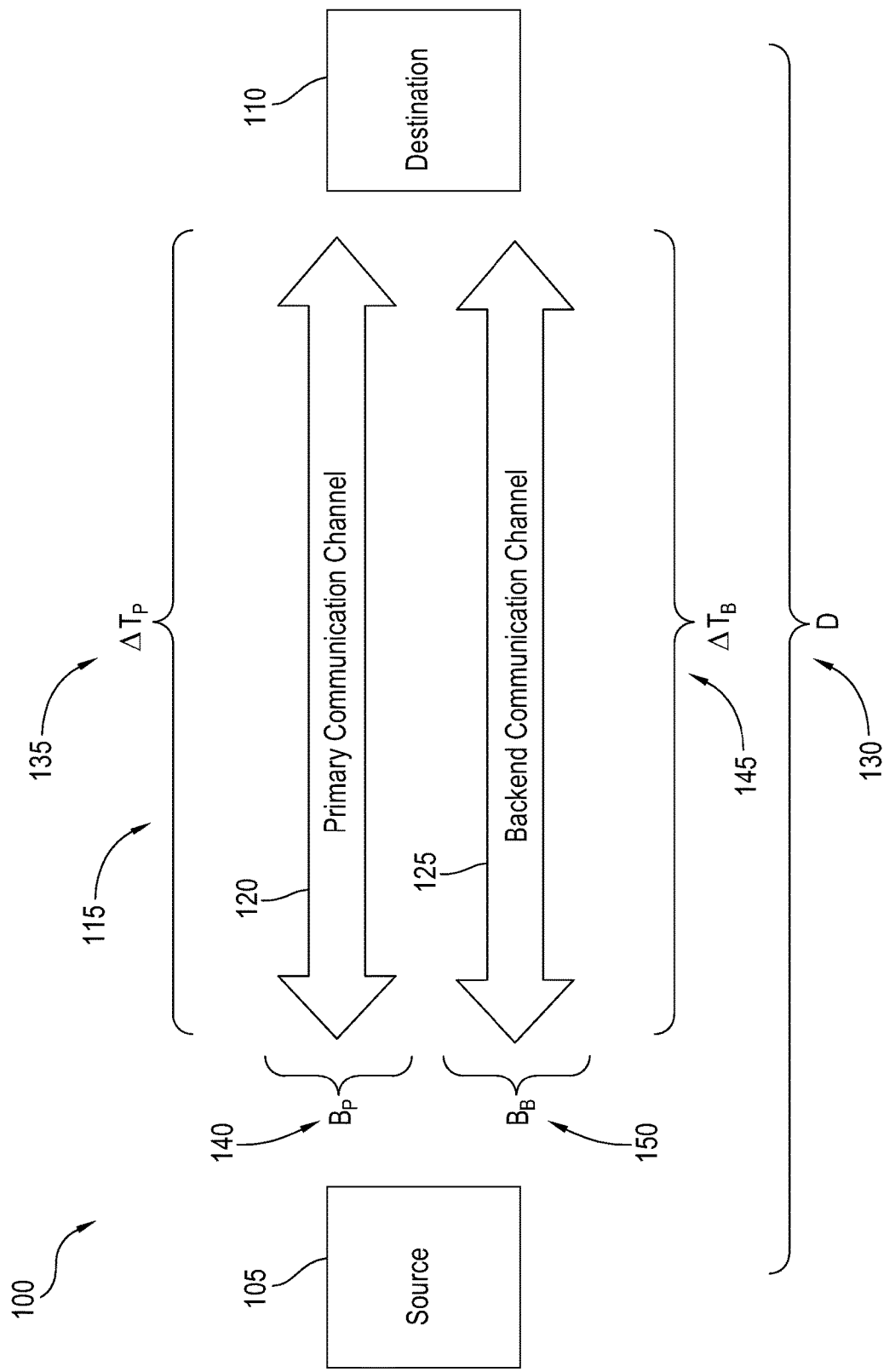
FIG. 1 is a diagrammatic view of a communication system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a generic version of a communication system 100 according to one example. As shown, the communication system 100 includes an information source 105 and an information destination 110. The information source 105 and information destination 110 operatively communicate with one another through one or more communication channels 115. Communication over these communication channels 115 can be one-way type communications and/or two-way type communications. In the illustrated example, the communication channels 115 between the information source 105 and information destination 110 include a primary communication channel 120 and a backend communication channel 125. In other examples, the communication system 100 can include just a single communication channel 115 or more than two communication channels 115.

As will be explained in further detail below, the communication system 100 can be used in a number of situations, especially in situations where the information source 105 and information destination 110 are located physically remote from one another. The communication system 100 for instance can be used for private, commercial, medical, military, and/or governmental purposes. For the purposes of explanation, the communication system 100 will be described for use with a financial trading system, but it should be recognized that the communication system 100 can be adapted for other uses such as for issuing military commands and performing remote telemedicine procedures. In this example, the information source 105 and information destination 110 generally represent the locations of the computer systems for remotely located stock/commodity exchanges and/or financial institutions that trade on those exchanges. Some examples of these exchanges include the New York Stock Exchange (NYSE), the NASDAQ Stock Market, Tokyo Stock Exchange (TYO), the Shanghai Stock Exchange, the Hong Kong Stock Exchange, Euronext, London Stock Exchange, Shenzhen Stock Exchange, Toronto Stock Exchange, Bombay Stock Exchange, Chicago Mercantile Exchange (CME), Chicago Board of Trade (CBOT), and the New York Mercantile Exchange (NYMEX), just to name a few.

As shown in FIG. 1, the information source 105 and information destination 110 are physically separated by a distance (D) 130. For instance, the exchanges represented by the information source 105 and information destination 110 can be separated by mountains, continents, and even oceans. This physical distance 130 creates a delay or latency in communications between the information source 105 and information destination 110 locations. Normally, but not always, the greater the distance 130, the longer the latency for a given communication channel 115. In most cases, the distance 130 between these exchanges prevents direct line of sight communications which further increases latency as well as increases the risk for communication errors. For instance, the information destination 110 can be located past the radio horizon for the information source 105. With trading as well as other activities, time and communication accuracy are crucial. Any delays can cause traders to lose money, and likewise, any communication errors can cause a loss. Communication errors can be reduced but usually at the cost of higher latency and/or greater bandwidth requirements. Most communication channels 115 have limited bandwidth to some degree. The latency and bandwidth capabilities can vary depending on the construction and type of communication channel 115.

As can be seen, the primary communication channel 120 has a primary channel latency ($\Delta_{TP}$) 135 and a primary channel bandwidth ($B_P$) 140. The backend channel latency 145 primary communication channel 120 has a backend channel latency ($\Delta_{TB}$) 145 and a backend channel bandwidth ($B_B$) 150. The communication channels 115 in FIG. 1 can have the same latency and bandwidth properties or different latency and/or bandwidth as well as other properties. In one example, the primary channel latency 135 of the primary communication channel 120 is less than the backend channel latency 145 of the backend communication channel 125, and the primary channel bandwidth 140 of the primary communication channel 120 is less than the backend channel bandwidth 150 of the backend communication channel 125. In some variations of this example, the primary communication channel 120 is a wireless communication channel (e.g., radio), and the backend communication channel 125 is a wired type communication channel (e.g., fiber optic cable). In one particular form, the primary communication channel 120 uses a skywave communication technique, and the backend communication channel 125 includes a non-skywave path such as a fiber optic cable. In other examples, the primary communication channel 120 and backend communication channel 125 represent different communication channels 115 for the same type of communication mode. For instance, primary communication channel 120 and backend communication channel 125 represent wireless communication channels having different frequency bands, and in one example, both communication channels 115 utilize high frequency (HF) radio to communicate via skywave propagation. With the primary communication channel 120 and backend communication channel 125 having different frequencies, the primary communication channel 120 and backend communication channel 125 can have different latencies, bandwidths, and/or communication error rates. For instance, the primary communication channel 120 in one situation can be noisier than the backend communication channel 125, but the primary communication channel 120 can have a shorter latency than the backend communication channel 125.

The HF radio communication channel 115 of the communication system 100 can be limited by the available assigned radio bandwidth and channel capacity at any given time. When using the HF radio communication channel 115 in a financial high frequency trading application, increasing the number and/or transmission speed of messages increases the profit potential of the communication system 100. As will be further explained below, a unique method has been developed to reduce latency of messages sent over a bandwidth-limited wireless communication channel 115. In addition to decreasing latency, the reduced overhead of this technique results in a higher number of transactions per unit of time that can be communicated and/or executed.

Figure 2:
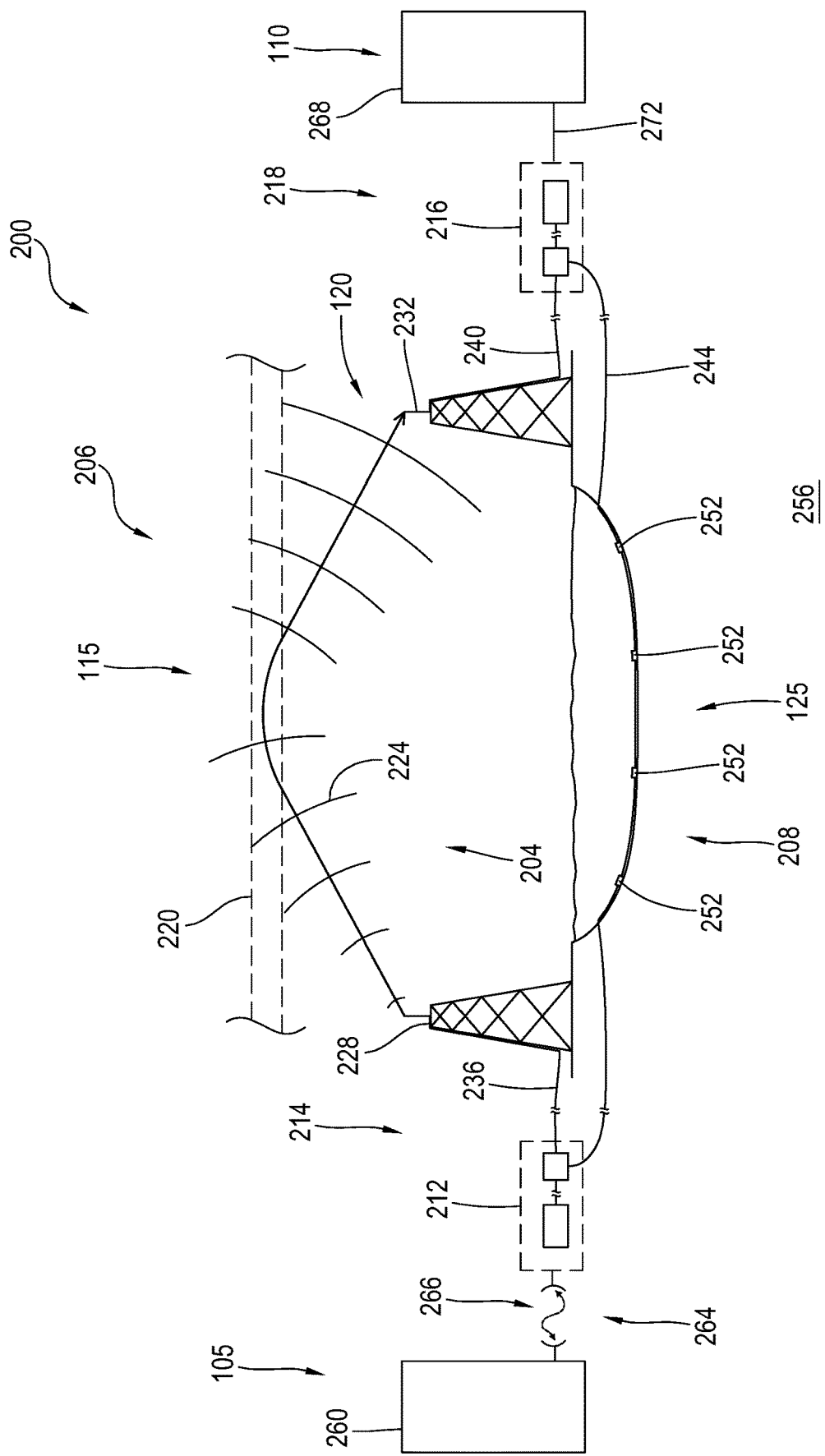
FIG. 2 is a diagrammatic view of a communication system according to another example.

FIG. 2 illustrates a specific example of a communication system 200 of the FIG. 1 communication system 100 configured to transfer data according to the unique technique described herein. Like in the FIG. 1 communication system 100, the communication system 200 in FIG. 2 includes the information source 105, information destination 110, and communication channels 115 that include the primary communication channel 120 and backend communication channel 125. Specifically, the communication system 200 in FIG. 2 is configured to transfer data via a low latency, low bandwidth communication link 204. In one form, the low latency, low bandwidth communication link 204 includes a high frequency radio channel (HF radio) 206. The communication system 200 in FIG. 2 is further configured to transfer data via a separate data via a high latency, high bandwidth communication link 208. The low latency, low bandwidth communication link 204 and high latency, high bandwidth communication link 208 provide separate connections between a first communication node 212 at a transmission station 214 and a second communication node 216 at a receiving station 218. The low latency, low bandwidth communication link 204 may be configured to transmit data using electromagnetic waves 224 passing through free space via skywave propagation between a transmitting antenna 228 and a receiving antenna 232. The electromagnetic waves 224 may be generated by a transmitter in the first communication node 212, passed along a transmission line 236 to the transmitting antenna 228. The electromagnetic waves 224 may be radiated by the transmitting antenna 228 encountering an ionized portion of the atmosphere 220. This radiated electromagnetic energy may then be refracted by the ionized portion of the atmosphere 220 causing the electromagnetic waves 224 to redirect toward the earth 256. The electromagnetic waves 224 may be received by the receiving antenna 232 coupled to the second communication node 216 by the transmission line 240. As illustrated in FIG. 2, a transmitting communication node may use skywave propagation to transmit electromagnetic energy long distances across the surface of the earth 256 without the need of one or more transmission lines 236 to carry the electromagnetic energy.

Data may also be transmitted between the transmission station 214 and receiving station 218 using the high latency, high bandwidth communication link 208. As illustrated in FIG. 2, the high latency, high bandwidth communication link 208 may be implemented using a transmission line 244 passing through the earth 256, which may include passing under or through an ocean or other body of water. As shown in FIG. 2, the high latency, high bandwidth communication link 208 may include one or more repeaters 252. FIG. 2 illustrates four repeaters 252 along the transmission line 244 although any suitable number of repeaters 252 may be used. The transmission line 244 may also have no repeaters 252 at all. Although FIG. 2 illustrates the low latency, low bandwidth communication link 204 transmitting information from the first communication node 212 to the second communication node 216, the data transmitted may pass along the low latency, low bandwidth communication link 204 and high latency, high bandwidth communication link 208 in both directions.

As shown, the communication system 200 further includes a client 260 that has a connection 264 to the first communication node 212. The client 260 is configured to send instructions over the connection 264 to the first communication node 212. In the illustrated example, the connection 264 includes a wireless connection 266 such as a microwave network. At the first communication node 212, the instructions are prepared to be sent to the second communication node 216, either by the low latency, low bandwidth communication link 204 or the high latency, high bandwidth communication link 208, or both. As shown, the second communication node 216 is connected to an instruction processor 268 via a connection 272. It should be recognized that the connection 272 can include wireless connection 266 like a microwave or other type of wireless connection. The client 260 may be any business, group, individual, and/or entity that desires to send instructions over a distance. The instruction processor 268 may be any business, group, individual, and/or entity that is meant to receive or act upon those instructions. In some embodiments, the connection 264 and connection 272 may be unnecessary as the client 260 may send the data to be transmitted directly from the first communication node 212 or the second communication node 216 may be connected directly to the instruction processor 268. The communication system 200 may be used for any kind of low-latency data transmission that is desired. As one example, the client 260 may be a doctor or surgeon working remotely while the instruction processor 268 may be a robotic instrument for working on a patient.

In some embodiments, the client 260 may be a financial instrument trader and the instruction processor 268 may be a stock exchange. The trader may wish to provide instructions to the stock exchange to buy or sell certain securities or bonds at specific times. Alternatively or additionally, the instructions are in the form of news and/or other information supplied by the trader and/or a third party organization, such as a news organization or a government. The trader may transmit the instructions to the first communication node 212 which sends the instructions and/or news to the second communication node 216 using the transmitting antenna 228, receiving antenna 232, and/or by the transmission line 244. The stock exchange can then process the actions desired by the trader upon receipt of the instructions and/or news.

The communication system 200 may be useful for high-frequency trading, where trading strategies are carried out on computers to execute trades in fractions of a second. In high-frequency trading, a delay of mere milliseconds may cost a trader millions of dollars; therefore, the speed of transmission of trading instructions is as important as the accuracy of the data transmitted. In some embodiments, the trader may transmit preset trading instructions or conditions for executing a trade to the second communication node 216, which is located within close proximity to a stock exchange, using the high latency, high bandwidth communication link 208 at a time before the trader wishes to execute a trade. These instructions or conditions may require the transmission of a large amount of data, and may be delivered more accurately using the high latency, high bandwidth communication link 208. Also, if the instructions or conditions are sent at a time prior to when a trade is wished to be executed, the higher latency of the high latency, high bandwidth communication link 208 can be tolerated.

The eventual execution of the instructions may be accomplished by the trader transmitting triggering data to the communication system 200 on which the instructions are stored. Alternatively or additionally, the triggering data can includes news and/or other information supplied by the trader and/or a separate, third party organization. Upon receipt of the triggering data, the trading instructions are sent to the stock exchange and a trade is executed. The triggering data that is transmitted is generally a much smaller amount of data than the instructions; therefore, the triggering data may be sent over the low latency, low bandwidth communication link 204. When the triggering data is received at the second communication node 216, the instructions for a specific trade are sent to the stock exchange. Sending the triggering data over the low latency, low bandwidth communication link 204 rather than the high latency, high bandwidth communication link 208 allows the desired trade to be executed as quickly as possible, giving the trader a time advantage over other parties trading the same financial instruments.

Figure 3:
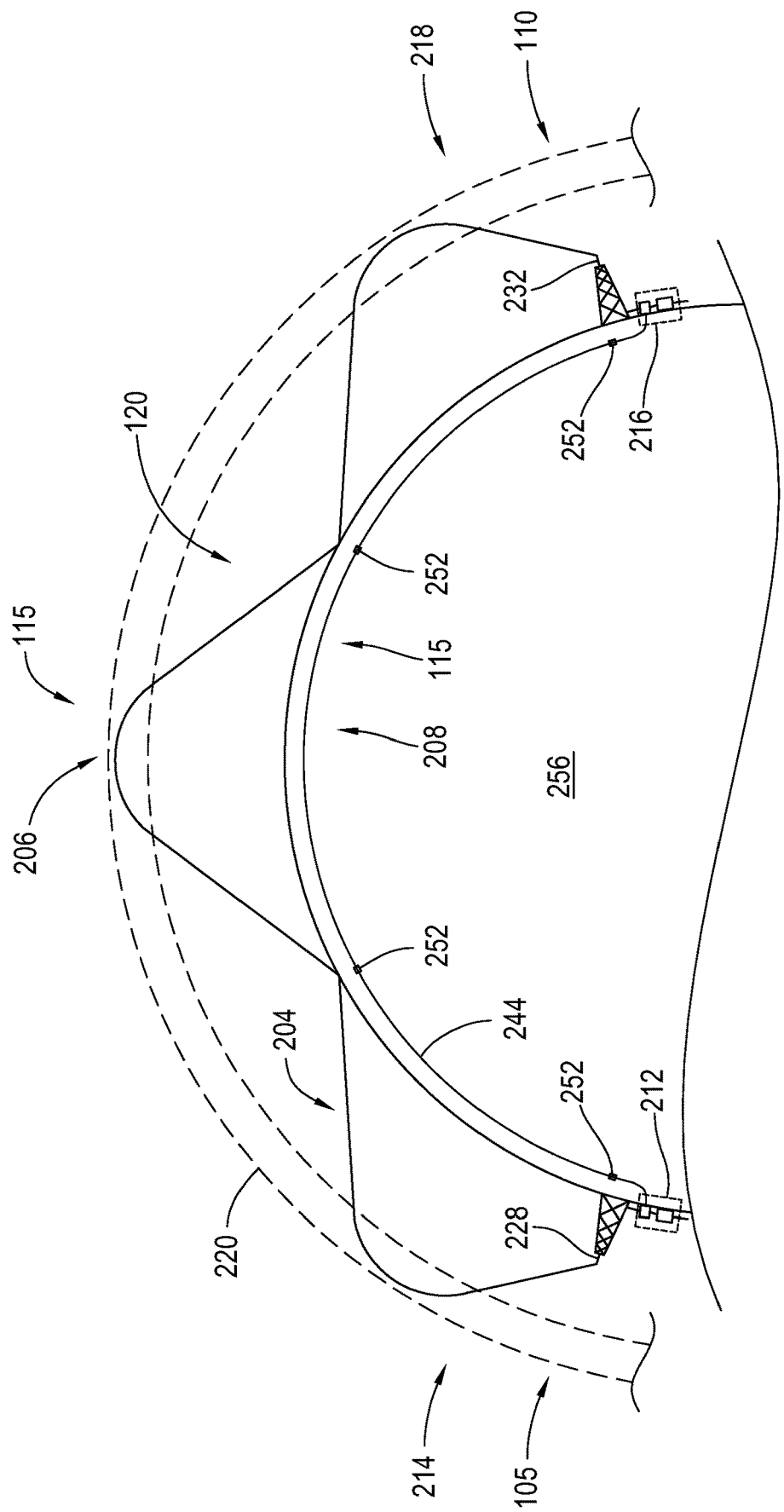
FIG. 3 is a side view of the FIG. 2 communication system in one variation.

The configuration shown in FIG. 2 is further illustrated in FIG. 3 where the first communication node 212 and the second communication node 216 are geographically remote from one another separated by a substantial portion of the surface of the earth 256. This portion of the earth's surface may include one or more continents, oceans, mountain ranges, and/or other geographic areas. For example, the distance spanned in FIG. 2 may cover a single continent, multiple continents, an ocean, and the like. In one example, the first communication node 212 is in Chicago, Illinois in the United States of America, and the second communication node 216 is in London, England, in the United Kingdom. In another example, the first communication node 212 is in New York City, New York, and the second communication node 216 is in Los Angeles, California, both cities being in North America. As shown, the transmitting antenna 228 and receiving antenna 232 are separated by a distance greater than the radio horizon such that no line of sight communications can be made. Instead, a skywave communication technique is used in which the electromagnetic waves 224 of the low latency, low bandwidth communication link 204 are skipped multiple times between the transmitting antenna 228 and receiving antenna 232. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, the low latency, low bandwidth communication link 204 transmits the electromagnetic waves 224 into a portion of the atmosphere 220 that is sufficiently ionized to refract the electromagnetic waves 224 toward the earth 256. The waves may then be reflected by the surface of the earth 256 and returned to the ionized portion of the upper atmosphere 220 where they may be refracted toward earth 256 again. Thus electromagnetic energy may "skip" repeatedly allowing the electromagnetic waves 224 to cover distances substantially greater than those which may be covered by non-skywave propagation.

Figure 4:
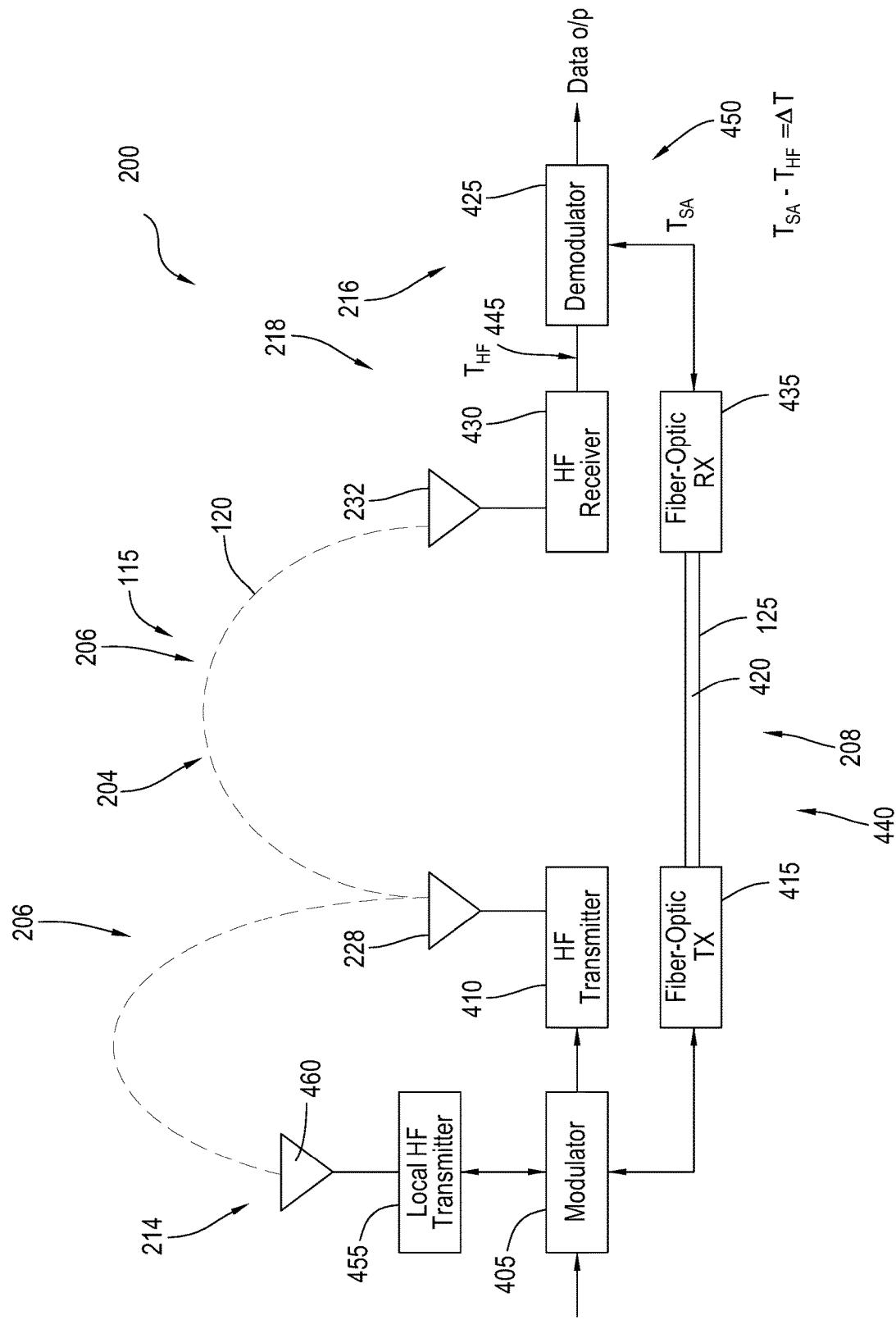
FIG. 4 is a diagrammatic view of the FIG. 2 communication system showing further details.

FIG. 4 shows a specific implementation of the FIG. 2 communication system 200. As can be seen, the first communication node 212 at the transmission station 214 in FIG. 4 includes a modulator 405, a radio transmitter 410, and a fiber optic transmitter 415. The modulator 405 includes one or more processors and memory along with other electronics, software, and/or firmware configured to modulate the message and/or other information using the above-mentioned variable messaging length technique which will be further described below. The radio transmitter 410 is operatively connected to the modulator 405 so as to transmit the message and/or other data to the receiving station 218 via the transmitting antenna 228 over the HF radio channel 206. In the depicted example, the radio transmitter 410 transmits the message and/or other data via the primary communication channel 120. The fiber optic transmitter 415 is operatively connected to the modulator 405 and a fiber optic cable 420 that forms at least part of the backend communication channel 125. The fiber optic transmitter 415 is configured to transmit to the second communication node 216 one or more message tables and/or other information, such as a duplicate copy of the message transmitted by the radio transmitter 410, via the backend communication channel 125.

The second communication node 216 in FIG. 4 includes a demodulator 425, a radio receiver 430, and a fiber optic receiver 435. The demodulator 425 includes one or more processors and memory along with other electronics, software, and/or firmware configured to demodulate the message and/or other information from the first communication node 212 using the above-mentioned technique which will be further described below. The radio receiver 430 is operatively connected to the demodulator 425 so as to receive the message and/or other data from the first communication node 212 via the receiving antenna 232. In the illustrated example, the radio receiver 430 again receives the message and/or other data via the primary communication channel 120. The fiber optic receiver 435 is operatively connected to the demodulator 425 and the fiber optic cable 420. The fiber optic receiver 435 is configured to receive from the fiber optic transmitter 415 of the first communication node 212 the message tables and/or other information, such as a duplicate copy of the message from the modulator 405 so as to enhance equalization. Together, the fiber optic transmitter 415, fiber optic cable 420, and fiber optic receiver 435 form at least in part a fiber optic network 440.

It should be recognized that the communication system 200 in FIG. 4 can facilitate one-way communication or two-way communication. For example, the modulator 405 can be configured to act as a modulator-demodulator (modem), and the demodulator 425 can likewise be a modem. The HF radio transmitter 410 in certain variations can be configured to receive wireless communications so as to act as a wireless transceiver. Similarly, the HF radio receiver 430 can also be a wireless transceiver. Both the fiber optic transmitter 415 and fiber optic receiver 435 can be fiber optic transceivers to facilitate two-way communication.

As mentioned before, messages transmitted along the primary communication channel 120 between the transmission station 214 and receiving station 218 experience some latency, and messages transmitted along the backend communication channel 125 likewise experience latency. The low latency, low bandwidth communication link 204 has a lower latency than the high latency, high bandwidth communication link 208 which creates a delay in reception of the same message transmitted along both communication channels 115 at the same time. Looking at FIG. 4 as an example, the HF radio channel 206 has a radio channel latency ($T_{HF}$) 445 as measured at the input for the demodulator 425, and the fiber optic network 440 has a secondary or backend channel latency ($T_{SA}$) 450 that is measured at the input for the demodulator 425. The latency difference between the HF radio channel 206 and fiber optic network 440 is in the form of a radio latency advantage ($\Delta T$).

With the equalization method described herein, a (near) exact replica of the data from the HF radio channel 206 is transmitted to the demodulator 425 at the receiving station 218 over the fiber optic network 440. The information sent on the secondary or backend communication channel 125 is compared to the previously received waveform data from the primary communication channel 120. The differences (i.e., the channel induced error values) are used as inputs to the equalizer algorithms which work to reduce the primary channel impairments before decoding the received data. By transmitting the data copy over the fiber optic network 440 of the backend communication channel 125, bandwidth on the HF radio channel 206 of the primary communication channel 120 is conserved.

This secondary or backend channel copy data can for instance include the raw user data, whereby the demodulator 425 can use its knowledge of the encoding methods used by the modulator 405 at the transmission station 214 to establish what waveforms were transmitted by recreating them locally at the receiving station 218. This secondary channel data can also include the waveform data that was sent across the channel after the modulation and other baseband or transmit processes. A digitized version of a modulated audio signal or modulated low intermediate frequency signal can be used for this secondary channel data. The secondary channel data can further include a sample version of the transmitted signal from the radio transmitter 410. It should be recognized that subsets of this information, other related types of information, and/or any combination of this information can be transmitted over the fiber optic network 440 so as to enhance equalization.

Ideally, the exact waveform transmitted from the transmitting antenna 228 of the radio transmitter 410 would be the most beneficial copy of the message to transmit over the backend communication channel 125 because the waveform would include the distortions present in the radio transmitter 410 under the current conditions. In the illustrated example of FIG. 4, the transmission station 214 includes a local radio receiver 455 with a local receiver antenna 460 that is operatively connected to the modulator 405. Among other things, the radio channel latency 445 is designed to receive the waveform for the data transmitted from the radio transmitter 410. This copy of the waveform is then transmitted over the fiber optic network 440 to the demodulator 425 at the receiving station 218 so as to enhance equalization. The local radio receiver 455 can be used for other purposes such as for monitoring transmissions from the radio transmitter 410 in order to control and/or perform maintenance on the modulator 405, radio transmitter 410, and/or transmitting antenna 228. It should be recognized that the transmission received at the local radio receiver 455 will have increased latency when transmitted to the demodulator 425 at the receiving station 218. Moreover, the local radio receiver 455 and local receiver antenna 460 can undesirably add distortions to the secondary channel data. In another example, the modulator 405 and/or secondary channel latency 450 is able to model the distortions of the radio transmitter 410 and transmitting antenna 228. In one version, the modulator 405 modifies the modulated message to incorporate these distortions, and this modified message is transmitted to the demodulator 425 over the fiber optic network 440. In another version, the modulator 405 transmits the raw data to the demodulator 425 over the fiber optic network 440, and the demodulator 425 performs the modeling to simulate the transmitted message waveform. It should be recognized that this modeling approach reduces latency when sending the secondary channel data.

In the illustrated example, the secondary transport mechanism is the fiber optic network 440, but other networks may be used as the backend communication channel 125 in other examples including, but not limited to, combinations of digital subscriber loop, coaxial cable, passive optical networks, and/or microwave radio. Any or all can be combined with high-speed fiber transport without changing the architecture and the nature of the communication system 200.

Again, the fiber optic network 440 has more delay than the HF radio channel 206, but the fiber optic network 440 is virtually error free, making the fiber optic network 440 suitable for all non-real time communications as well as for providing an image of the transmitted HF signal in order to optimize the performance of the HF radio channel equalizer in the demodulator 425. At the receiving station 218, this perfect far-end transmit information would make near-perfect equalization possible if the HF radio channel 206 was stationary, but the HF radio channel 206 is typically not stationary so some intersymbol (ISI) is likely to remain. When the message copy from the backend communication channel 125 arrives very closely in time to the HF radio signal of the primary communication channel 120 then channel adaptation or equalization at the demodulator 425 will be likely very good, but if the message copy from the fiber optic network 440 is grossly delayed (i.e., ΔT is large) then the channel equalization will be likely poor.

In wireless systems, sometimes end-to-end bi-directional signaling is required to perform a variety of functions such as changing the modulation technique when channel conditions change, monitoring network performance, transmitting of new encoding schemes, and/or changing of encryption schemes. By using a bi-directional backend communication channel 125, the signaling for this type of data traffic can be accomplished without using the primary communication channel 120. However, for the purposes of equalization with this technique, a unidirectional secondary or backend communication channel 125 is adequate.

For equalizer systems, the output of the equalizer is ideally identical to the transmitted data symbol D(n) (after suitable transmit and receive filtering) with some noise added. The equalizer output Data D"(n) will vary from ideal by the noise on the signal plus any channel distortions not corrected by an adaptive equalizer. Errors in the equalizer result in inter-symbol interference (ISI) where a specific information symbol is spread in time so that the symbol interferes with a neighboring data symbol. The decision device selects the most probable symbol transmitted. The error signal can be generated from the equalizer output D"(n) and the difference between it and one or more of a known reference signal such as a training sequence, pilot symbols embedded periodically into the message stream, and/or the decision output D'(n).

The equalization method used by the communication system 200 forgoes the lost channel capacity associated with pilot symbols, pilots tone, or other a-priori signals used to support channel estimation. Instead, the method directly uses the backend communication channel 125 to send the exact information transmitted to use in calculating the tap values for the channel equalizer in the demodulator 425. It nevertheless should be recognized that in certain variations the pilot tones and/or symbols can be occasionally used to further enhance equalization.

Referring to Table 1 500 in FIG. 5, it was previously found that a 50 millisecond (ms) delay over an International Telecommunication Union (ITU) disturbed HF radio channel resulted in some degradation in system performance as compared to a simulated method. In a trans-Atlantic transmission case, the radio latency or delay advantage (ΔT) between fiber optic network 440 and HF radio channel 206 is expected to be much less than 50 ms, such as around 10 to 15 ms. Further, it is expected the HF radio channel 206 in such a case will be usually moderate or calm such that the HF radio channel 206 will less often be in the disturbed state (as defined by the ITU).

Looking at the example delay of 50 ms in Table 1 500 of FIG. 5, there is a 5% delay compared to the coherence time (50 ms/1000 ms) in the transmit data information given a link with an error floor of approximately 10-2. For the moderate channel, Table 1 500 shows a link delay of 2.5% and an improvement to 3·10-3. For the calm channel, the error floor is not reached (i.e., 0.5% delay) and the degradation is modest (i.e., about 1 dB at 30 dB SNR). The relatively long time for the HF radio channel 206 in this case to change compared to the end-to-end delay of the backend communication channel 125 allows the secondary channel equalization technique to successfully equalize the HF radio channel 206 using the delayed transmit signal.

Feedforward and feedback taps in the equalizer can be used in delay tolerant systems in order to capture most of the time delay spread of the channel. The communication channels 115 are typically characterized by root mean square (RMS) delay spread. The RMS delay spread is typically defined as the standard deviation, or root-mean-square, value of the delay of reflections, weighted proportionally to the energy in the reflected waves. Very high performance equalizers tend to introduce delay on the order of this RMS value and are likely longer if the delay spread to be corrected is set to several standard deviations. For the high-frequency trading applications, however, long delays due to equalization are not acceptable.

There are several techniques that can be used to address this long equalization delay. With one technique, the time delay difference between the primary communication channel 120 and backend communication channel 125 (ΔT) is measured by the communication system 200, and the impact of this delay on the equalizer performance is determined. In another technique, the delay of the equalizer is varied according to the channel conditions so that the performance of the communication system 200 optimizes message throughput subject to a minimum time delay advantage ($T_{REQ}$) and a maximum useful time delay advantage ($T_{MAX}$). Using another technique, the performance of the HF radio channel 206 is estimated using the equalizer internal tap values, and the equalization delays are truncated according to the channel conditions. In a further technique, a predictive equalization strategy is used to reduce the effects of the time delay differential ($\Delta T$) between the two communication channels 115. It should be appreciated that a combination of these approaches can be used.

As noted before, intersymbol interference (ISI) is a challenge faced by equalizers. Delayed energy from previous symbols as well as energy from the current symbol may precede the main energy arrival of any symbol, thereby causing ISI. If reaching an acceptable error rate so that only energy from past symbols is subtracted from the current symbol is possible, then the equalizer delay needs be very small, perhaps on the order of one or a few symbols. In practice, the HF radio delay advantage ($\Delta T$) is able to tolerate some delay in order to remove some of the ISI ahead of the main signal leading edge as the delay advantage ($\Delta T$) will be several symbol times when operating on a 10 kHz HF communication system 200. In one implementation, a 10 kHz channel with 8,000 symbols per second is used. Using these values, the channel behavior can be scaled in terms of symbols as shown in Table 2 600 in FIG. 6.

As can be seen in Table 2 600, the channel delay spread is long, but the doppler spread is relatively slow in view of symbol time. In practical terms, capturing the entire delay spread in the equalizer would result in a delay of a one to a few milliseconds for a disturbed channel. The secondary channel equalization method and communication system 200 considers the effects of delays in the equalizer on the overall delay performance for the communication system 200 to truncate the equalizer to meet both packet error rate (PER) and delay requirements.

In addition to the trading strategies being employed, a number of technical factors affect the trading profitability of the FIG. 2 communication system 200. It should be appreciated that the time delays between the FIG. 2 communication system 200 and the trades of competitors impacts profitability such as during high-speed financial transactions. The larger time advantage of the FIG. 2 communication system 200 over a competitor network results in higher potential profits, especially when aggregated over multiple financial transactions. The trading network where the financial transactions take place (e.g., a stock or commodity exchange) has a certain amount of processing jitter in the order of when transactions are processed. If the timing advantage between the competitor network and the communication system 200 is small relative to the trading system jitter, then the value of the advantage drops because a message from the competitor network may be executed before one from the FIG. 2 communication system 200 some fraction of the time, even when the message from the FIG. 2 communication system 200 arrived first.

Messages errors, such as the number of messages received correctly, can also impact profitability. Sometimes a message cannot be decoded properly and/or the error correction technique is not capable of reliably correcting the message within the time advantage window (or ever). This leads to message erasure in which the transmitted message is deleted and/or never decoded properly at the receiving station 218. It should be appreciated that message erasures can detrimentally impact profitability of the HF radio channel 206 using the FIG. 2 communication system 200 or other communication systems 100. The number of errored messages delivered to the trading system further impacts client profitability which in turn impacts the potential profitability of the communication system 200. These errored messages occur when the demodulator 425 incorrectly decodes as something that is not a message, such as radio noise and/or message fill data, as a valid message.

In the aggregate, timing advantages and system performance affect the economic value of the FIG. 2 communication system 200. For instance, the timing advantage over one or more competitor networks, the number of messages transmitted, and message error rates are some of the factors that impact profitability. These factors can offset one another. For example, the value of a successful message may decrease as the system timing advantage over competitors decreases. This effect is exacerbated by the trading system jitter.

Figure 7:
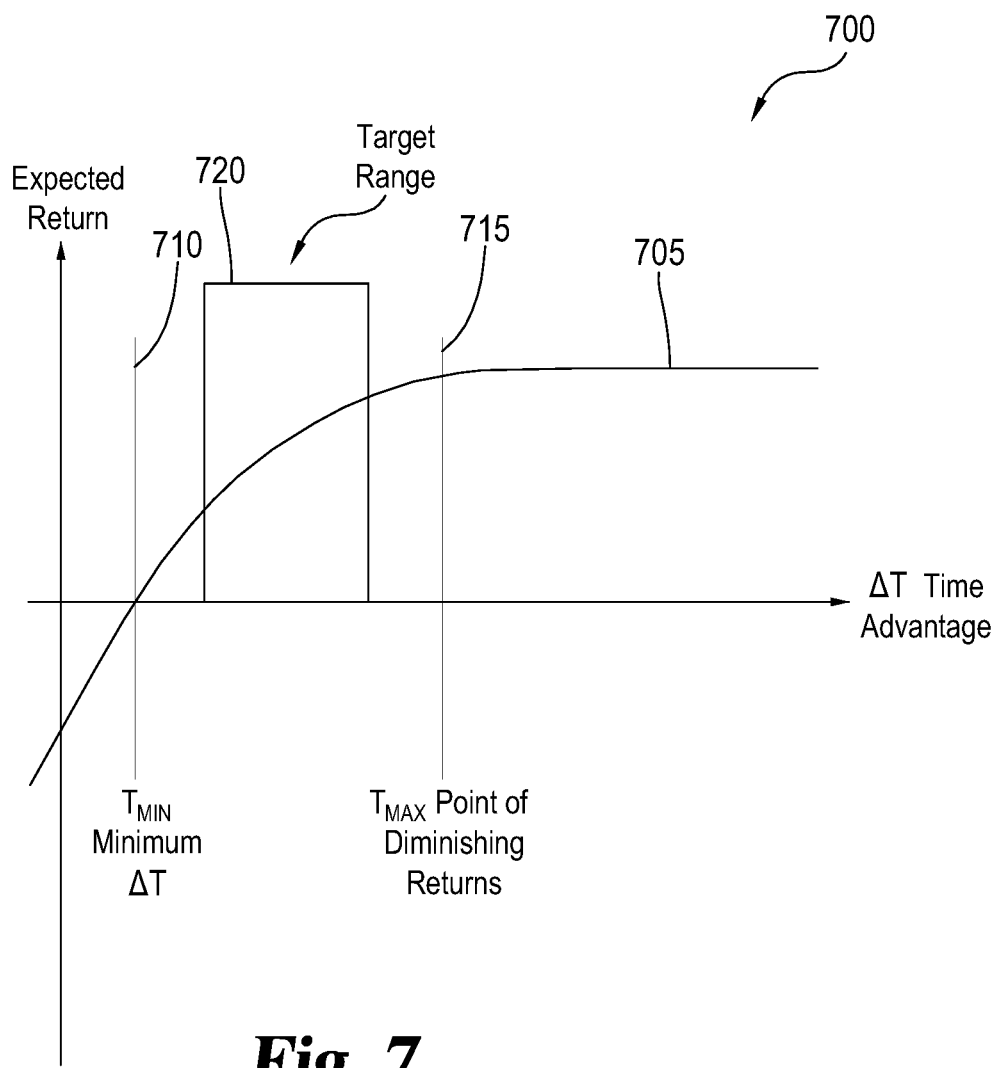
FIG. 7 is a graph of a delay advantage as compared to an expected rate of return.

Looking at a graph 700 in FIG. 7, the concept of diminishing returns also applies resulting in a reduced increase in value per unit of time advantage as the absolute advantage grows. That is to say that as a specific effect or advantage gets larger the rewards do not typically scale in a linear manner, and there is a point of maximum or diminishing returns provided. In the high-frequency trading case, this reduction in the value is usually faster due to the inability of a competitor to respond to an action any faster, fewer players willing to participate when they are more severely disadvantaged, jitter in the exchange trading system, and/or other factors. This situation is shown graphically by the graph 700 in FIG. 7.

As shown by an expected return line 705 in the graph 700, there is a minimum delay time advantage limit ($T_{MIN}$) 710 where the timing advantage over competitor networks of the FIG. 2 communication system 200 will result in profitability from a statistical perspective (e.g., on average). Among other things, the minimum delay time advantage limit 710 provides a tolerance or safety margin to account for financial trading system jitter. However, there is also a diminishing returns point or maximum delay time advantage limit ($T_{MAX}$) 715 where having the FIG. 2 communication system 200 being even faster than the competitor only minimally impacts the expected return, or even not at all. Between the minimum delay time advantage limit 710 and maximum delay time advantage limit 715, there is a target range 720 where the communication system 100 should normally operate to ensure profitability.

In addition to timing advantage, the transmission performance of the communication system 100 affects the economic value of the communication system 100. Simply put, more messages being delivered by the FIG. 2 communication system 200 results in more profit potential. Radio and other transmissions are not perfect. The messages decoded at the receiving station 218 can be correct, erased, or an error (i.e., a false positive message). Each message type has an expected value with errored messages having a negative expected value (a loss). Erased messages can have either a neutral value (no gain or loss) or represent a loss due a missed trade or opportunity that needed to be executed.

Lower order modulating and coding (MODCOD) schemes can reduce error rates but at the expense of the time advantage over competitor networks. The lower MODCOD schemes require overhead that increases packet size which in turn reduces the delay advantage and reduces message throughput. With the technique discussed herein, some time advantage is sacrificed in order to support higher orders of MODCOD resulting in a higher message throughput.

As noted before with respect to FIG. 7, the time advantage has an optimum or target range 720. For instance, it makes little sense to have a large number of messages with minimal expected return (i.e., the delay advantage is very small). This situation can occur when the modulation is complex, but the equalizer needs to be very long to correct the channel distortions. Similarly, the operating mode is sub-optimum if there are close to zero (0) message failures in the communication system 200, but the delay advantage has reached the maximum delay time advantage limit 715.

Figure 12:
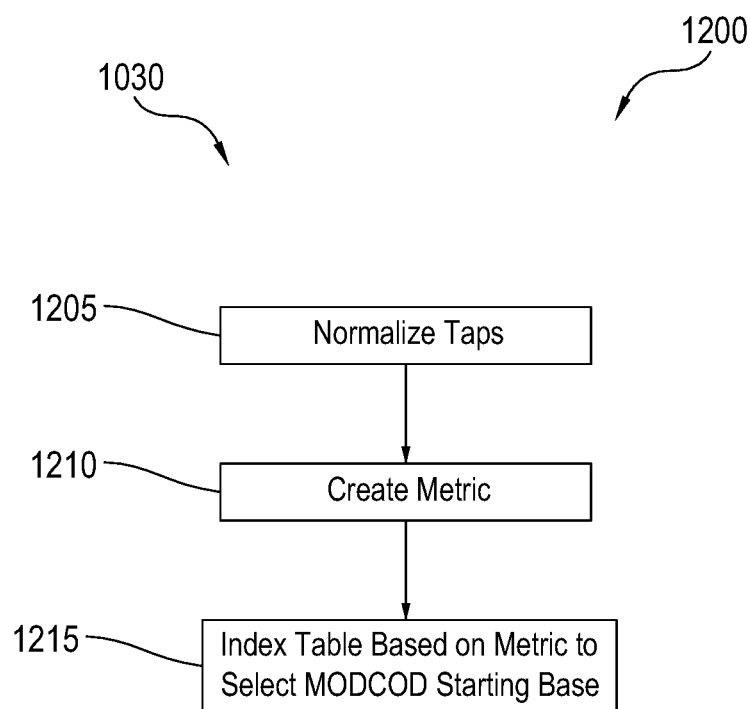
FIG. 12 is a flowchart of illustrating a method of selecting the MODCOD.

To balance these as well as other concerns, the unit 1115 sets a delay range window or the target range 720, and the unit 1115 of the equalizer 1100 then aims to maximize the number of messages successfully received subject to staying within the target range 720, as is shown by a chart 800 in FIG. 12. As show, the chart 800 shows competitor data arrival time (TC) 805 and system data arrival time 810. As can be seen, the time difference between the competitor data arrival time 805 and primary communication channel 120 creates a system delay advantage 815. At a minimum, the unit 1115 of the equalizer 1100 attempts to keep the system data arrival time 810 between the minimum delay time advantage limit ($T_{MIN}$) 710 and diminishing returns point or maximum delay time advantage limit ($T_{MAX}$) 715, and more preferably, within the target range 720. As indicated by double arrow 820, adjusting the bits/symbol changes the system delay advantage 815. For example, reducing the bit/symbol generally increases the length of time required to equalize and decode the message such that the system delay advantage 815 is reduced, and increasing the number of bits per symbol generally reduces the time, thereby increasing the system data arrival time 810. In FIG. 12, double arrow 825 indicates the equalizer length. Generally speaking, longer equalizer windows increase the equalization time to the message which in turn reduces the system delay advantage 815, and shorter equalization windows reduce the message processing time, thereby increasing the system delay advantage 815.

Figure 8:
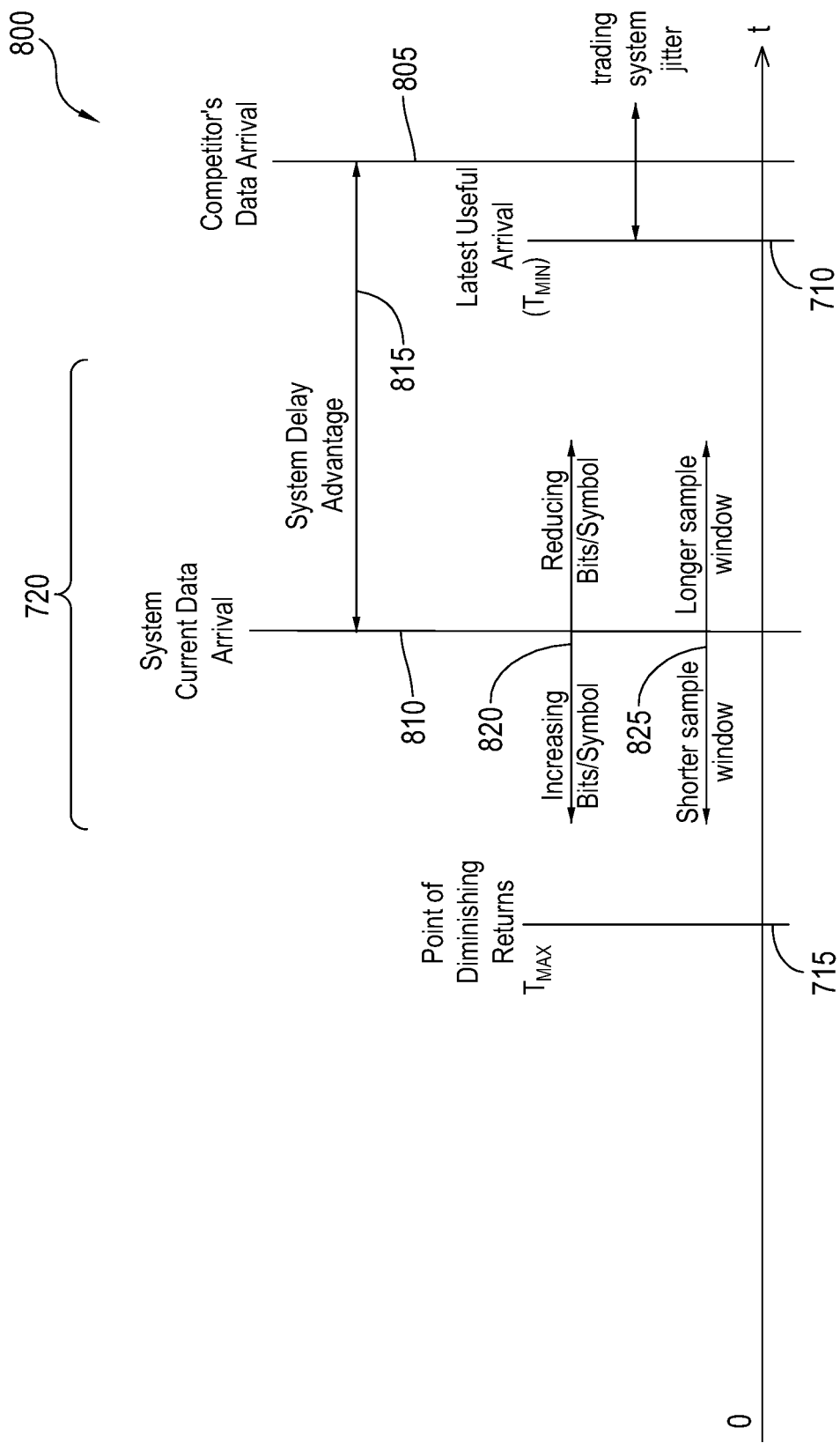
FIG. 8 is a chart of a financial trading delay environment.

With the secondary channel equalization technique, the demodulator 425 optimizes equalizer performance within the range of minimum delay time advantage limit 710 and maximum delay time advantage limit 715 as shown in FIG. 8 by using the equalizer characteristics and a reference signal including the transmitted data sent over the fiber optic network 440 or other backend communication channel 125 as shown in FIG. 4. At least two potential performance issues are considered in the architecture for this method. First, the time delay difference between the primary communication channel 120 and backend communication channel 125 ($\Delta T$) can cause the equalizer to diverge from ideal internal tap weightings. Second, the equalizer needs to also compensate for received signals that are spread out over a period of time. A more disturbed radio channel requires a long equalizer and hence adds to system delay.

One aspect of the secondary or backend channel equalization method will be initially described with reference to FIGS. 9 and 10. This technique is usually performed at the receiving station 218 by the processor and memory demodulator 425 and/or other computer system, but the technique can be performed elsewhere or by other systems. This method can be performed through software, firmware, hardware, or some combination thereof. For purposes of explanation, the method will be described as being performed through equalizer software on the demodulator 425. In this example, separate software or virtual equalizers run on the demodulator 425 as separate software processes. It should be recognized that this technique can be performed through an electronic or hardware implementation.

Figure 9:
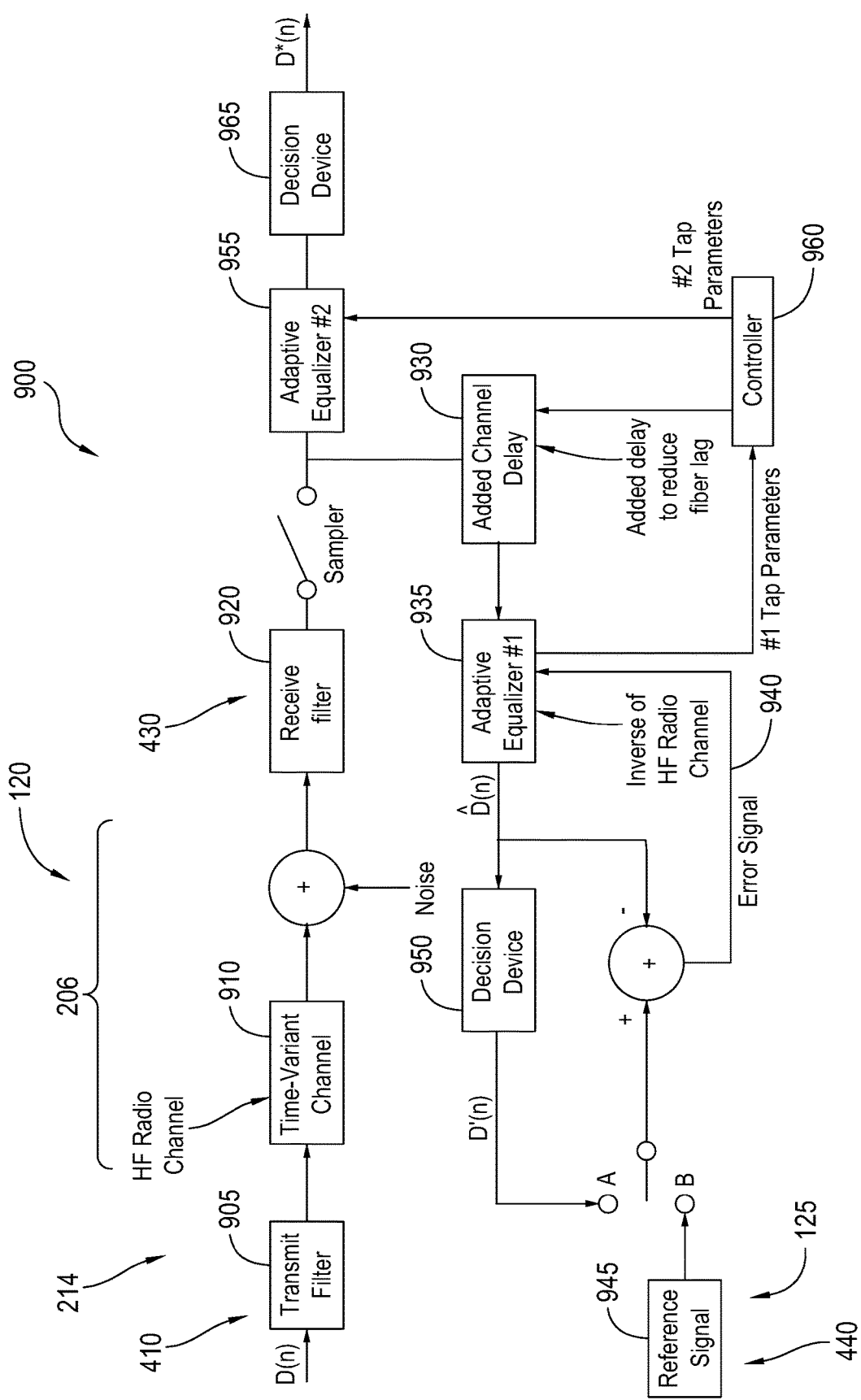
FIG. 9 is a block diagram of a signal equalization system.
Figure 10:
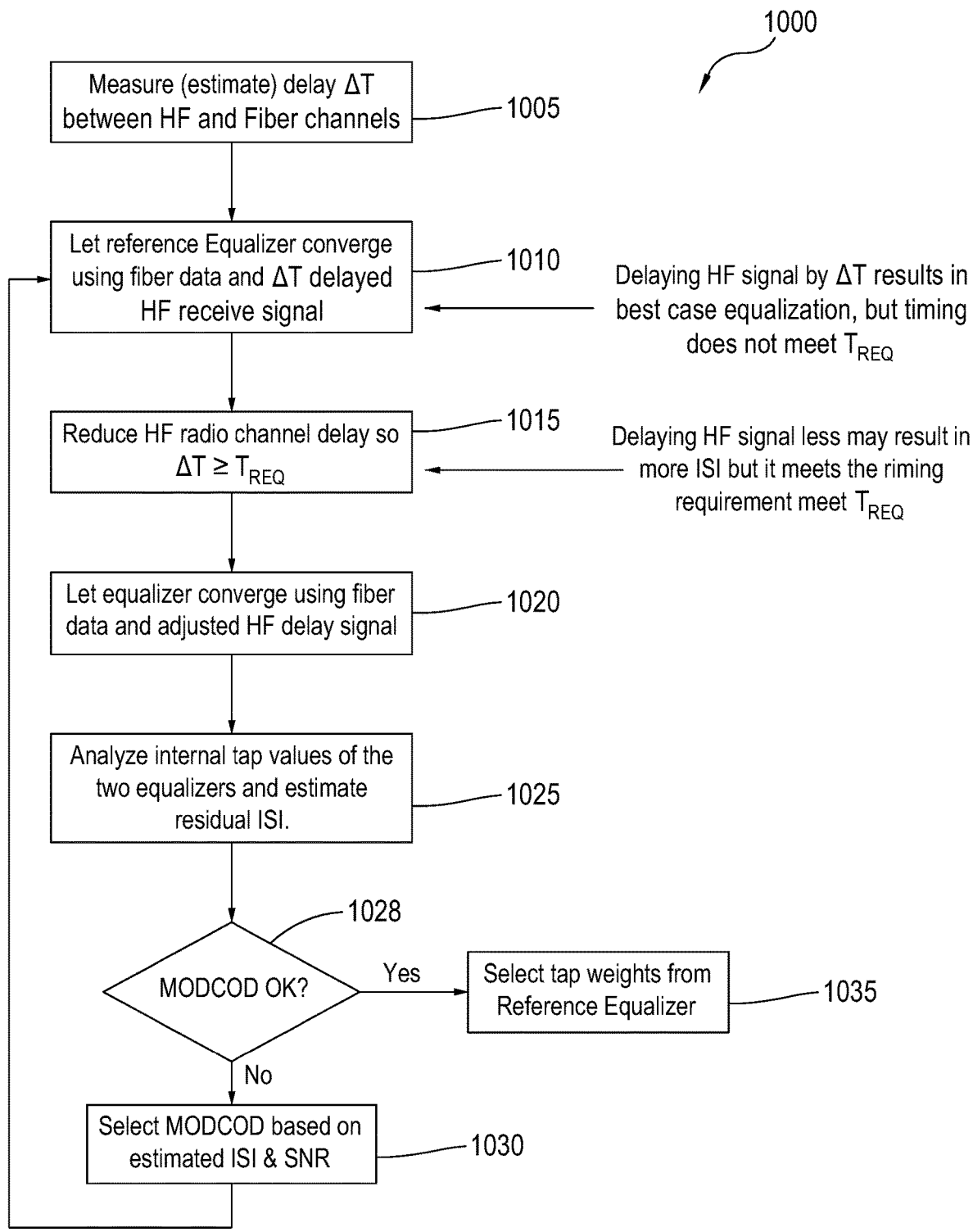
FIG. 10 is a flowchart of illustrating a method for selecting modulation and coding (MODCOD) based on equalizer performance.

FIG. 9 shows a block diagram of one example of a signal equalization system 900 that is configured to perform this method. As shown, the signal equalization system 900 includes a transmit filter 905 at the transmission station 214. The radio transmitter 410 at the transmission station 214 transmits a HF radio signal along a time-variant channel 910. As can be seen, the time-variant channel 910 experiences noise 915. In the illustrated example, the time-variant channel 910 forms the HF radio channel 206. At the radio receiver 430, a receive filter 920 receives the signal. In the illustrated example, the functions of the equalizer again are incorporated into the demodulator 425 in the form of software. As shown, the demodulator 425 includes a sampler 925, a channel delay unit 930, and a reference or first adaptive equalizer 935. The channel delay unit 930 delays the HF radio signal so as to at least partially compensate for the time delay difference between the primary communication channel 120 and backend communication channel 125 ($\Delta T$) so as to reduce equalizer divergence. The adaptive equalizer 935 adapts at least based on an error signal 940. The error signal 940 is based at least in part on the message copy received as a reference signal 945 over the fiber optic network 440 of the backend communication channel 125. The output of the reference equalizer 935 is sent to a first decision device 950 to make equalization decisions.

As previously mentioned, the time delay difference between the primary communication channel 120 and backend communication channel 125 ($\Delta T$) can cause the equalizer to diverge from ideal internal tap weightings. A method or technique of selecting modulation and coding (MODCOD) based on equalizer performance will now be described with reference to a flowchart 1000 shown in FIG. 10. In order to optimize the performance of the communication system 200, the demodulator 425 at the receiving station 218 estimates any impact caused on the equalizer performance by creating a reference equalizer. In this example, the reference equalizer is a software type or simulated equalizer operating on the demodulator 425 (e.g., in the form of the signal equalization system 900 in FIG. 9), but other types of equalizers can be used.

As will be explained in greater detail below, the demodulator 425 later creates a second, identical equalizer 955 that is identical to the reference equalizer. The reference equalizer is used to determine the optimal equalizer characteristics, regardless of the minimum timing requirements ($T_{MIN}$ or $T_{REQ}$) set forth in FIGS. 7 and 8. As can be seen, the system 100 further includes a controller 960 and a second decision device 965. The controller 960 generally controls the operation of the system 900. As shown, the controller is operatively coupled to the reference equalizer 935, the channel delay unit 930, and the identical equalizer 955. The second decision device is operatively coupled to the identical equalizer 955, and the second decision device 965 is configured to provide an output (D*(n)) for the system 900.

With the reference equalizer 935, the HF radio signal from the HF radio channel 206 is slowed or delayed so that the timing of the HF radio signal message from the HF radio channel 206 matches the timing of the copy message from the fiber optic network 440. The characteristics of the HF radio channel 206 can then be modeled or determined based on the reference equalizer 935 which can enhance the actual equalization process. The identical twin equalizer 955 is used to process the real-time received signal with its potentially less than optimal equalizer characteristics that are able to at least satisfy or exceed the minimum delay time advantage limit ($T_{MIN}$) 710. For example, the reference equalizer 935 can be used to determine to what extent the HF radio signal can be delayed and how the reference equalizer taps can be truncated to meet the delay and ISI requirements.

To create the reference equalizer 935, the demodulator 425 measures or estimates the radio channel latency ($T_{HF}$) 445 and the secondary or backend channel latency ($T_{TP}$) 450 (FIG. 4) in stage 1005. Based on these measurements and/or estimates, the demodulator 425 calculates the latency difference between the HF radio channel 206 and fiber optic network 440 in the form of a radio transmission time advantage. In stage 1010, the reference equalizer 935 is configured to not meet the timing requirements of the minimum delay time advantage limit 710 ($T_{MIN}$ or $T_{REQ}$) shown in FIGS. 7 and 8. In other words, the reference equalizer 935 is designed to be generally too slow as compared to a competitor network to consistently provide profitable outcomes on average. However, the reference equalizer 935 serves as a best case for comparison purposes so that the receiving station 218 knows the upper equalization limits. The approach of this technique allows the signal equalization system 900 to optimize its behavior using the perfect information from the backend communication channel 125 and the HF radio channel 206 without a delay constraint (i.e., as if ΔT delay was not important). In this manner, the demodulator 425 arrives at a better, if not best, image of the HF radio channel behavior. A bit error rate (BER), package error rate (PER), or other data quality measurement may be done on the ideal, reference equalizer 935 to confirm proper operation.

Looking at FIG. 9, the HF radio channel delay from the channel delay unit 930 in stage 1015 reduces the HF channel delay to the identical equalizer 955. While the equalizer may experience more ISI, the HF channel delay is reduced to meet or exceed the timing requirements of the minimum delay time advantage limit ($T_{MIN}$) 710 so that the communication system 200 operates generally within the target range 720. In stage 1020, the reference adaptive equalizer 935 is converged using the copied message data from the fiber optic network 440 and the HF radio signal that has been delayed by the channel delay unit 930. In stage 1025, the controller 960 determines the state of HF channel and determines optimum MODCOD for the channel conditions. If the optimum MODCOD is not the current one to use in stage 1028, the controller 960 signals the far end modulator 405 to change MODCOD and the process of FIG. 10 returns to stage 1010. If the current (or new) MODCOD is deemed optimum in stage 1028, then the controller 960 in stage 1035 loads the tap parameters for the twin equalizer 955 which uses these to decode real-time data. The second tap parameters (#2 Tap Parameters in FIG. 9) used by the twin, identical equalizer 955 are a truncated set of the first tap parameters (#1 Tap Parameters) from the reference equalizer 935 that have been truncated to meet the time delay requirements.

Any adaptive system needs a method of measuring performance. With signal equalization system 900 in FIG. 9, the measurement is observed of the mean magnitude and other characteristics of the error signal 940. While this is a gross measurement of the overall performance, the error signal 940 does not provide specific insight into internal operation of the signal equalization system 900. An enhanced approach is to evaluate tap (complex) values individually to arrive at a deeper understanding of the behavior of the signal equalization system 900 to determine what would be a sub-optimum solution from a symbol error rate perspective but superior from a message throughput and delay performance.

Figure 11:
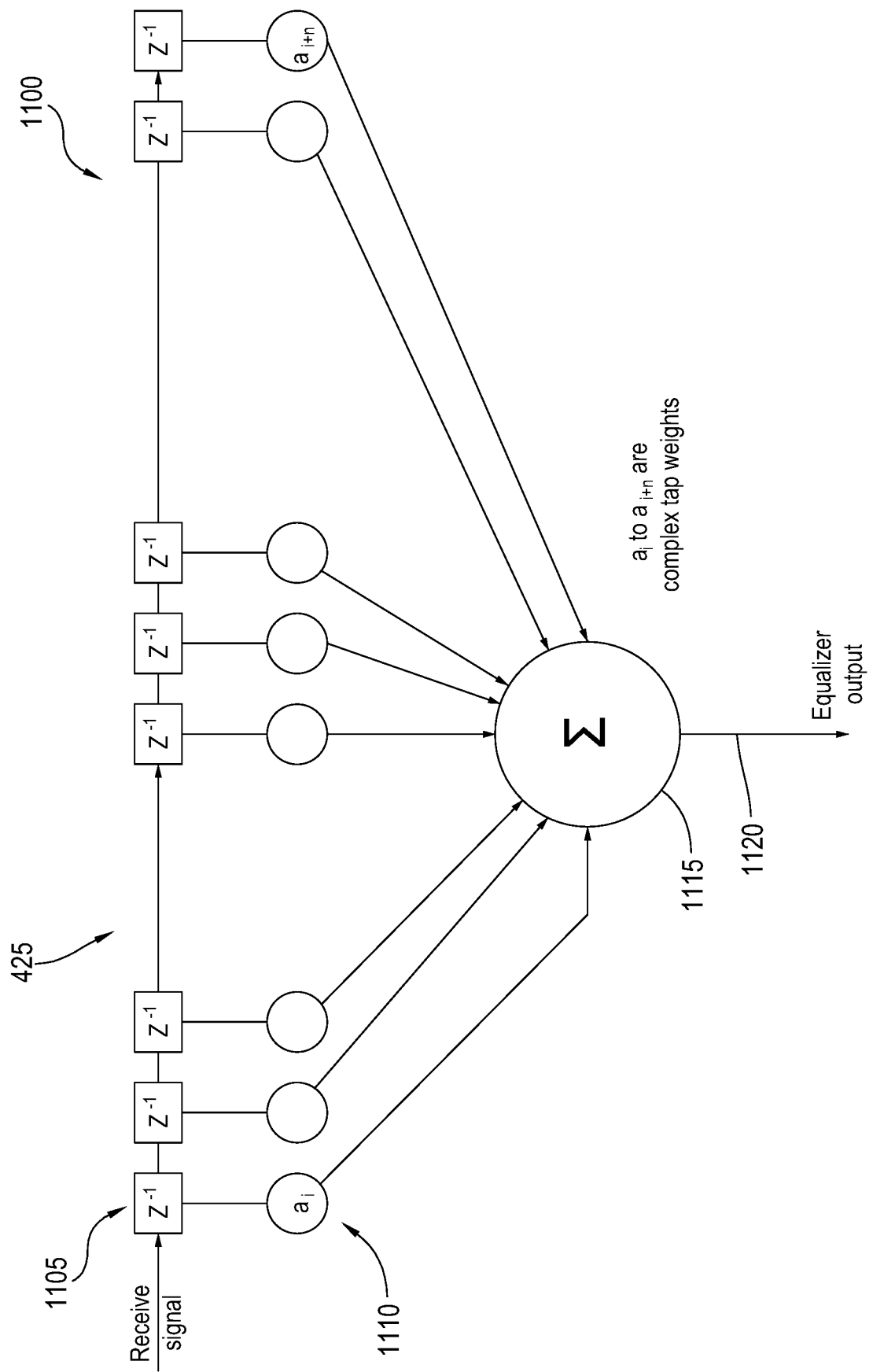
FIG. 11 is a block diagram of an equalizer.

In order to select the modulation and coding (MODCOD) scheme, the signal equalization system 900 uses a metric based on the internal tap weightings of the equalizer in stage 1025. The values of the taps in the reference equalizer 935 can be used to estimate any residual ISI by examining the tap weightings omitted in the truncated real-time equalizer 955. In another embodiment, a delayed version of the real-time equalizer 955 is used to measure residual ISI based on the sub-optimum tap settings. As shown in FIG. 11, an equalizer 1100 of a delayed line with selected (or all) delayed values of a received signal 1105 are multiplied by complex tap weights (amplitude and phase) at taps 1110 and summed at unit 1115 in order to produce equalizer output 1120 with reduced ISI. For the purposes of estimating the performance of the equalizer 1100 that is subject to the delay constraints in the above-discussed example, the RMS value of the magnitudes of the equalizer tap values once normalized are used so that the RMS sum of the magnitudes for each equalizer is 1. This metric serves as a pointer into a table containing the support MODCODs in the communication system 200 in stage 1030. In one example, the signal equalization system 900 selects the MODCOD scheme based on the estimated ISI from stage 1025 and the SNR. A variety of other possible metrics are suitable for this purpose.

Referring again to FIG. 11, some taps 1110 of the equalizer 1100 are forward looking, and some are backward looking. The backward looking taps 1110 do not result in delay but accommodating the forward looking taps 1110 requires that a delay line be used in advance of the equalizer output 1120. One way to minimize system delay is to reduce the number of forward taps 1110 in the communication system 200.

One technique for minimizing delay by reducing the number of forward taps 1110 is illustrated by a flowchart 1200 in FIG. 12. In stage 1205, all taps 1110 are normalized in the equalizer 1100 so that the sum of the squares of the tap weightings is 1. The equalizer 1100 or other system creates a metric in stage 1210 by subtracting the squares of the magnitudes of the feed forward taps 1110 to be removed. This value will be less than 1 due to stage 1205. The communication system 200 in stage 1215 uses this metric to index a table to select which MODCOD to use starting as a base with the current MODCOD in use or the one identified for stage 1030 in FIG. 10. Following the MODCOD selection the tap weightings of the converged reference equalizer 935 are truncated in a manner to meet the delay requirements.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization. In the case of radio waves, an antenna may transmit at frequencies ranging along an electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data. Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical, horizontal, or any combination thereof. Antennas may also be configured to radiate electromagnetic energy within a specific range of vertical angles (i.e. "takeoff' angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies. Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Backend Communication Channel", "Secondary Communication Channel", or "Secondary Channel" generally refers to a communication pathway that is a main choice for transferring information. Typically, but not always, the secondary channel has one or more properties, such as latency or bandwidth, that make the channel less desirable over a primary channel. For example, a secondary channel can have a lower data rate and/or latency as compared to a primary channel. A primary channel may support the transfer of information in one direction only, either direction alternately, or both directions simultaneously. The secondary channel can for example include wired and wireless forms of communication.

"Band" or "Frequency Bandwidth" generally refer to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Checksum" generally refers to data derived from a block of digital data for the purpose of detecting errors that may have been introduced during its transmission and/or storage. Typically, the checksum data is relatively small-sized. By themselves, checksums are often used to verify data integrity, but checksums are not typically relied upon to verify data authenticity. The procedure or process that generates the checksum from a data input is called a checksum function or checksum algorithm. Depending on the use case, a good checksum algorithm will usually output a significantly different value, even for small changes made to the data input. When the computed checksum for a data input matches the stored value of a previously computed checksum, the probability that the data has not been accidentally altered and/or corrupted is high. Some checksum algorithm techniques include parity byte, sum complement, and position-dependent algorithms. Check digits and parity bits are special cases of checksums that are usually appropriate for small blocks of data. Some error-correcting codes are based on special checksums which not only detect common errors, but the error correcting code in some cases further helps in the recovery of the original data.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Critical angle" generally refers to the highest angle with respect to a vertical line extending to the center of the Earth at which an electromagnetic wave at a specific frequency can be returned to the earth using skywave propagation.

"Critical Frequency" generally refers to the highest frequency that will be returned to the Earth when transmitted vertically under given ionospheric conditions using skywave propagation.

"Cyclic Redundancy Check" or "CRC" generally refers to an error-detecting code or technique to detect errors in digital data. For example, CRC is commonly used in digital networks and/or storage devices to detect accidental changes to raw data. CRC is based on binary division, and CRC is also sometimes referred to as polynomial code checksum. With CRC, blocks of data get encoded with or attached a short check value that is based on the remainder of a polynomial division of the contents of the blocks of data. During retrieval or decoding, the calculation is repeated. When the check values do not match, corrective action can be taken against data corruption. CRCs can be further used to facilitate error correction. The check or data verification value is a redundancy because it expands the message without adding information. CRCs can be simple to implement in binary hardware, easy to analyze mathematically, and are good at detecting common errors caused by noisy transmission channels. Given the check value has a fixed length, the function that generates the check value is sometimes used as a hash function.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz. Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Demodulation" generally refers to a process of extracting an original information-bearing signal from a carrier wave.

"Demodulator" or "Detector" generally refers to a device, such as an electronic circuit and/or computer, that extracts original information from a received modulated waveform based on one or more properties of the waveform. For example, these properties of the waveform can include amplitude, frequency, phase, and harmonics as well as other properties. After reception of the modulated carrier, the demodulator recovers the original modulating signal by the process of demodulation or detection. One or more modulators can be integrated with one or more demodulators to form a modulator-demodulator (modem). As such, the term demodulator may further refer to one or more parts, components, and/or software that demodulate within a modem.

"Downshift" generally refer to changing a communication system to a less complex modulation scheme.

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source. Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels. The photon is the quantum of the electromagnetic interaction and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Equalizer" generally refers to an electronic and/or software-based filter that modifies the frequency response (amplitude and phase versus frequency) of a system for a specific purpose. Equalizers typically realize a more complicated frequency response in which the amplitude response varies continuously with frequency, amplifying some frequencies and attenuating others. An equalizer may have a response fixed in time or may be automatically and continuously adjusted. However, the frequency response of an equalizer is usually, but not always, matched to some external physical medium, such as a communication channel, and thus adjustable.

"Error Correction Code", "Error Correcting Code", or "ECC" generally refers to data and/or algorithms for expressing a sequence of numbers or other data such that any errors which are introduced can be detected and corrected within certain limitations based on the remaining numbers or data. ECC is typically used for controlling errors in data over unreliable and/or noisy communication channels. For instance, the sender encodes the message with a redundant in the form of an ECC. There are two main categories of ECCs, block codes and convolution codes. Some non-limiting examples of ECC codes include AN, BCH, Berger, constant-weight, convolutional, cyclic redundancy check (CRC), expander, group, Golay, Goppa, Hadamard, Hagelbarger, Hamming code, Latin square based, lexicographic, long, low-density parity-check (i.e., Gallager code), LT, polar, raptor, Reed-Solomon error correction, Reed-Muller, repeat-accumulate, repetition (e.g., triple modular redundancy), spinal, rateless, nonlinear, tornado, near-optimal erasure correcting, turbo code, and Walsh-Hadamard codes.

"Fiber-optic Communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial Instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Forward Error Correction" or FEC generally refers to a technique used for controlling errors in data transmission over unreliable or noisy communication channels. Typically, but not always, a sender encodes the message in a redundant way by using an error-correction code (ECC). This redundancy allows a receiver to detect a limited number of errors that may occur anywhere in the message, and the redundancy often allows these errors to be corrected without retransmission. FEC gives the receiver the ability to correct errors without needing a reverse channel to request retransmission of data. However, higher forward channel bandwidth is typically required. FEC can be used in situations where retransmissions are costly or impossible, such as one-way communication links and when transmitting to multiple receivers in multicast. FEC is commonly used in modems. FEC information can also be added to mass storage devices to enable recovery of corrupted data. There are generally two types of FEC code categories, block codes and convolution codes. FEC block codes work on fixed-size blocks (or packets) of bits or symbols of predetermined size. Some non-limiting examples of block codes include Reed-Solomon, Golay, BCH, multidimensional parity, and Hamming codes. Typical block codes are usually decoded using hard-decision algorithms in which for every input and output signal a hard decision is made whether it corresponds to a one or a zero bit. Convolutional FEC codes work on bit or symbol streams of arbitrary length. Convolutional codes are typically decoded using soft-decision algorithms like the Viterbi, MAP or BCJR algorithms that process (discretized) analog signals, and which allow for much higher error-correction performance than hard-decision decoding. Convolutional FEC codes are most often soft decoded with the Viterbi algorithm, though other algorithms can be used.

Viterbi decoding allows asymptotically optimal decoding efficiency with increasing constraint length of the convolutional code, but at the expense of exponentially increasing complexity. A convolutional code that is terminated is also a block code in that it encodes a block of input data, but the block size of a convolutional code is generally arbitrary, while block codes have a fixed size dictated by their algebraic characteristics. Types of termination for convolutional codes include tail-biting and bit-flushing. Some other non-limiting examples of FEC techniques include turbo coding, low density parity check (LDPC), interleaving, and local decoding. Many FEC coders (but not all) can also generate a bit-error rate (BER) signal which can be used as feedback to fine-tune the analog receiving electronics.

"Ground" is used more in an electrical/electromagnetic sense and generally refers to the Earth's surface including land and bodies of water, such as oceans, lakes, and rivers.

"Ground-wave Propagation" generally refers to a transmission method in which one or more electromagnetic waves are conducted via the boundary of the ground and atmosphere to travel along the ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those. The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Intersymbol Interference" or "ISI" generally refers to a form of distortion of a signal in which one symbol interferes with subsequent symbols. Typically, but not always, ISI is an unwanted phenomenon as the previous symbols have a similar effect as noise which make communication less reliable. For example, the spreading of a pulse beyond the allotted time interval causes the pulse to interfere with neighboring pulses. ISI is usually, but not always, caused by multipath propagation and/or the inherent linear or non-linear frequency response of a communication channel causing successive symbols to blur together.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending upon a number of factors including solar activity, such as sunspots.

"Jitter" generally refers to a variable delay in the receipt of a transmitted message. For example, jitter arises as messages arrive at an input at varying intervals, and as a result, the receiver of the message has to wait a variable time before a data slot is available for message transport.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{high} \leq \frac{d}{c} \cdot k$$

where:
    d=distance (miles)
    c=the speed of light in a vacuum (186,000 miles/sec)
    k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k$$

where:
    d=distance (miles)
    c=the speed of light in a vacuum (186,000 miles/sec)
    k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the earth using skywave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Message" generally refers to a discrete unit of communication intended by a source for consumption by a recipient or group of recipients.

"Modem" or "Modulator-Demodulator" generally refers to a device, such as an electronic circuit and/or computer, that performs the functions of modulation and demodulation of a signal such as through a modulator and a demodulator.

"Modulation" generally refers to the process of varying one or more properties of a periodic waveform, called the carrier signal, with a modulating signal that typically contains information to be transmitted.

"Modulator" generally refers to a device, such as an electronic circuit and/or computer, that varies one or more properties of a periodic waveform, called the carrier signal, with a modulating signal that typically contains information to be transmitted. For example, these properties of the waveform can include amplitude, frequency, phase, and harmonics as well as other properties. By way of a non-limiting example, the modulator can control the parameters of a high-frequency electromagnetic information carrier in accordance with electrical signals of the transmitted message. One or more modulators can be integrated with one or more demodulators to form a modulator-demodulator (modem). As such, the term modulator may further refer to one or more parts, components, and/or software that functions as a modulator within a modem.

"Non-skywave propagation" generally refers to all forms of transmission, wired and/or wireless, in which the information is not transmitted by reflecting an electromagnetic wave from the ionosphere.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core.

"Optimum Working Frequency" generally refers to the frequency that provides the most consistent communication path via sky-wave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Packet Error Rate" or "Packet Error Ratio" or "PER" generally refers to the number of incorrectly received data packets divided by the total number of received packets in a digital transmission. Generally, a packet is declared incorrect if at least one bit is erroneous.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted substantially vertically, and a different polarization when mounted substantially horizontally. As a transverse wave, the magnetic field of a radio wave is at right angles to that of the electric field, but by convention, talk of an antenna's "polarization" is understood to refer to the direction of the electric field. Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location.

"Primary Communication Channel" or "Primary Channel" generally refers to a communication pathway that is a first choice for transferring information. Typically, but not always, the primary communication channel has one or more properties, such as latency or bandwidth, that is desirable over others. For example, a primary communication channel can have the highest data rate of all the channels sharing a common interface. A primary communication channel may support the transfer of information in one direction only, either direction alternately, or both directions simultaneously. The primary communication channel can for example include wired and wireless forms of communication.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Quadrature Phase Shift Keying" or "QPSK" generally refers to a method of transmitting digital information on a carrier by changing the phase of the carrier. In QPSK there are four (4) different phase changes defined, each phase change represents the transmission of 2 bits.

"Radio" generally refers to electromagnetic radiation in the frequencies that occupy the range from 3 kHz to 300 GHz.

"Radio horizon" generally refers to the locus of points at which direct rays from an antenna are tangential to the ground. The radio horizon can be approximated by the following equation:

$$d \approx \sqrt{2h_t} + \sqrt{2h_r}$$

where:
d=radio horizon (miles)
$h_t$=transmitting antenna height (feet)
$h_r$=receiving antenna height (feet).

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Satellite Communication" or "Satellite Propagation" generally refers to transmitting one or more electromagnetic signals to a satellite which in turn reflects and/or retransmits the signal to another satellite or station.

"Signal-to-noise ratio" or "SNR" or "S/N" generally refers to a measure that compares a level of a desired signal to a level of background noise. SNR is calculated as the ratio of signal power to noise power, often expressed in decibels. A SNR higher than 1:1 (greater than 0 dB) indicates more signal than noise.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units. For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Skip distance" generally refers to the minimum distance from a transmitter to where a wave from skywave propagation can be returned to the Earth. To put it another way, the skip distance is the minimum distance that occurs at the critical angle for sky-wave propagation.

"Skip Zone" or "Quiet Zone" generally refers to an area between the location where a ground wave from ground wave propagation is completely dissipated and the location where the first skywave returns using skywave propagation. In the skip zone, no signal for a given transmission can be received.

"Skywave Propagation" refers generally to a transmission method in which one or more electromagnetic-waves radiated from an antenna are refracted from the ionosphere back to the ground. Skywave propagation further includes tropospheric scatter transmissions. In one form, a skipping method can be used in which the waves refracted from the ionosphere are reflected by the ground back up to the ionosphere. This skipping can occur more than once.

"Software-Defined Radio" or "SDR" generally refers to a radio communication system where components that have been traditionally implemented in hardware are instead implemented via software on a computer and/or embedded system. Some examples of hardware now implemented as SDR are mixers, filters, amplifiers, modulators/demodulators, detectors, and equalizers, just to name a few.

"Space-wave Propagation" or sometimes referred to as "Direct Wave Propagation" or "Line-of-sight Propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about ⅘ greater than the geometric line of sight.

"Spread Spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the earth's atmosphere extending from the troposphere to about 25 to 35 miles above the earth surface.

"Symbol" generally refers to a waveform, a state or a significant condition of the communication channel that persists, for a fixed period of time. For digital baseband transmissions, a symbol may be in the form of a pulse, and a symbol may be in the form of a tone in passband transmissions using modems. A transmitter or other device places symbols on one or more channels, and the receiver detects the sequence of symbols in order to reconstruct the transmitted data. In some cases, there may be a direct correspondence between a symbol and a small unit of data. For instance, each symbol can encode one or several bits. The data may also be represented by the transitions between symbols, and/or by a sequence of several symbols.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transfer Rate" generally refers to the rate at which something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission Line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line. Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to a path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-sight, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmission Time" generally refers to is the amount of time from the beginning until the end of a message transmission in a communication network. In the case of a digital message, the transmission time is the time from the first bit until the last bit of a message has left the transmitting node. For a digital packet, the packet transmission time can be obtained from the packet size and bit rate. The transmission time should not be confused with propagation delay which refers to the time it takes for the first bit to travel from a sender to a receiver.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the earth's atmosphere. The troposphere extends about 11 miles above the surface of the earth in the mid-latitudes, up to 12 miles in the tropics, and about 4.3 miles in winter at the poles.

"Tropospheric Scatter Transmission" generally refers to a form of skywave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Upshift" generally refer to changing a communication system to a more complex modulation scheme.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | communication system |
| 105 | information source |
| 110 | information destination |
| 115 | communication channels |
| 120 | primary communication channel |
| 125 | backend communication channel |
| 130 | distance |
| 135 | primary channel latency |
| 140 | primary channel bandwidth |
| 145 | backend channel latency |
| 150 | backend channel bandwidth |
| 200 | communication system |
| 204 | low latency, low bandwidth communication link |
| 206 | HF radio channel |
| 208 | high latency, high bandwidth communication link |
| 212 | first communication node |
| 214 | transmission station |
| 216 | second communication node |
| 218 | receiving station |
| 220 | atmosphere |
| 224 | electromagnetic waves |
| 228 | transmitting antenna |
| 232 | receiving antenna |
| 236 | transmission line |
| 240 | transmission line |
| 244 | transmission line |
| 252 | repeaters |
| 256 | earth |
| 260 | client |
| 264 | connection |
| 266 | wireless connection |
| 268 | instruction processor |
| 272 | connection |
| 405 | modulator |
| 410 | radio transmitter |
| 415 | fiber optic transmitter |
| 420 | fiber optic cable |
| 425 | demodulator |
| 430 | radio receiver |
| 435 | fiber optic receiver |
| 440 | fiber optic network |
| 445 | radio channel latency |
| 450 | secondary channel latency |
| 455 | local radio receiver |
| 460 | local receiver antenna |
| 500 | Table 1 |
| 600 | Table 2 |
| 700 | graph |
| 705 | expected return line |
| 710 | minimum delay time advantage limit |
| 715 | maximum delay time advantage limit |
| 720 | target range |
| 800 | chart |
| 805 | competitor data arrival time |
| 810 | system data arrival time |
| 815 | system delay advantage |
| 820 | double arrow |
| 825 | double arrow |
| 900 | signal equalization system |
| 905 | transmit filter |
| 910 | time-variant channel |
| 915 | noise |
| 920 | receive filter |
| 925 | sampler |
| 930 | channel delay unit |
| 935 | first adaptive equalizer |
| 940 | error signal |
| 945 | reference signal |

-continued

| Reference Numbers | |
|---|---|
| 950 | first decision device |
| 955 | second adaptive equalizer |
| 960 | controller |
| 965 | second decision device |
| 1000 | flowchart |
| 1005 | stage |
| 1010 | stage |
| 1015 | stage |
| 1020 | stage |
| 1025 | stage |
| 1028 | stage |
| 1030 | stage |
| 1035 | stage |
| 1100 | equalizer |
| 1105 | received signal |
| 1110 | taps |
| 1115 | unit |
| 1120 | equalizer output |
| 1200 | flowchart |
| 1205 | stage |
| 1210 | stage |
| 1215 | stage |

What is claimed is:

1. A method, comprising:
receiving a signal over a primary communication channel, wherein the primary communication channel includes a high frequency radio channel;
receiving at least a representative copy of the signal over a backend communication channel, wherein the backend communication channel has a greater latency and bandwidth than the primary communication channel;
determining a timing performance for the primary communication channel, wherein the timing performance includes a minimum time delay;
determining the minimum time delay at least based on financial trading timing data for a financial market;
determining a maximum delay time advantage limit, wherein the maximum delay time advantage limit is where being faster minimally impacts a rate of return in the financial market;
equalizing the primary communication channel with a first equalizer by comparing the signal with the representative copy, wherein the equalizing includes selecting a modulating and coding (MODCOD) scheme where an equalizer processing time for the equalizer is within the minimum time delay and the maximum delay time advantage limit;
establishing a best case performance of the first equalizer by delaying the signal by a delay during the equalizing;
converging a second equalizer with the first equalizer, wherein the converging occurs in response to the second equalizer at least satisfying the timing performance;
converging tap values of the first equalizer and the second equalizer;
combining the tap values of the first equalizer and the second equalizer to create a metric, wherein the metric includes an estimated inter-symbol interference (ISI) and signal to noise ratio (SNR);
selecting a modulation and coding method based on the metric; and
wherein the modulating and coding scheme is selected based on the estimated ISI and SNR.

2. The method of claim 1, wherein the second equalizer is identical to the first equalizer.

3. The method of claim 2, wherein the converging occurs in response to the signal not being additionally delayed.

4. The method of claim 1, wherein the primary communication channel includes a low bandwidth, low latency communication link.

5. The method of claim 1, wherein the backend communication channel includes a fiber optic network.

6. The method of claim 1, wherein the representative copy includes an exact copy of the signal.

7. The method of claim 1, wherein the representative copy includes characteristic information of the signal.

8. The method of claim 1, further comprising:
determining the minimum time delay at least based on a nature of the primary channel.

9. The method of claim 8, further comprising:
changing to a higher modulation format when the nature of the primary channel is benign.

10. The method of claim 8, further comprising:
determining the minimum time delay based on jitter of a financial market.

11. The method of claim 10, wherein the financial market includes a high frequency trading system.

12. The method of claim 1, further comprising:
indexing the modulation and coding method based on the metric.

13. The method of claim 1, further comprising:
reducing a time domain for the first equalizer by evaluating an effect of removing feed forward delay stages.

14. A method, comprising:
receiving a signal over a primary communication channel, wherein the primary communication channel includes a high frequency radio channel;
receiving at least a representative copy of the signal over a backend communication channel, wherein the backend communication channel has a greater latency and bandwidth than the the primary communication channel;
determining a timing performance for the primary communication channel, wherein the timing performance includes a minimum time delay;
determining the minimum time delay at least based on financial trading timing data for a financial market;
reducing a time domain for an equalizer by evaluating an effect of removing feed forward taps, wherein the reducing includes normalizing all taps in the equalizer where a sum of squares of tap weights for all of the taps is equal to one, wherein the reducing includes creating a metric by subtracting squares of magnitudes of the feed forward taps being removed from the sum of squares; and
selecting a modulating and coding (MODCOD) scheme based on the metric.

15. The method of claim 14, wherein the backend communication channel extends through an ocean.

16. The method of claim 14, wherein the determining the minimum time delay based on jitter of the financial market.

17. The method of claim 14, wherein the financial market includes a high frequency trading system.

18. A method, comprising:
receiving a signal over a primary communication channel, wherein the primary communication channel includes a high frequency radio channel;
receiving at least a representative copy of the signal over a backend communication channel;
determining a timing performance for the primary communication channel, wherein the timing performance includes a minimum time delay;
determining the minimum time delay based on jitter of a financial market;
determining a maximum delay time advantage limit, wherein the maximum delay time advantage limit is where being faster minimally impacts a rate of return in the financial market;
equalizing the primary communication channel with a first equalizer by comparing the signal with the representative copy, wherein the equalizing includes selecting a modulating and coding (MODCOD) scheme where an equalizer processing time for the equalizer is within the minimum time delay and the maximum delay time advantage limit;
establishing a best case performance of the first equalizer by delaying the signal by a delay during the equalizing;
converging a second equalizer with the first equalizer, wherein the converging occurs in response to the second equalizer at least satisfying the timing performance;
converging tap values of the first equalizer and the second equalizer;
combining the tap values of the first equalizer and the second equalizer to create a metric, wherein the metric includes an estimated inter-symbol interference (ISI) and signal to noise ratio (SNR);
selecting a modulation and coding method based on the metric; and
wherein the modulating and coding scheme is selected based on the estimated ISI and SNR.

19. The method of claim 18, wherein the backend communication channel includes a fiber optic network.

20. The method of claim 18, further comprising:
determining the minimum time delay at least based on a nature of the primary channel.

21. The method of claim 20, further comprising:
changing to a higher modulation format when the nature of the primary channel is benign.

22. A method, comprising:
receiving a signal over a primary communication channel, wherein the primary communication channel includes a high frequency radio channel;
receiving at least a representative copy of the signal over a backend communication channel;
determining a timing performance for the primary communication channel, wherein the timing performance includes a minimum time delay;
determining the minimum time delay based on jitter of a financial market;
reducing a time domain for an equalizer by evaluating an effect of removing feed forward taps, wherein the reducing includes normalizing all taps in the equalizer where a sum of squares of tap weights for all of the taps is equal to one, wherein the reducing includes creating a metric by subtracting squares of magnitudes of the feed forward taps being removed from the sum of squares; and
selecting a modulating and coding (MODCOD) scheme based on the metric.

23. The method of claim 22, wherein the backend communication channel includes a fiber optic network.

* * * * *

UNITED STATES PATENT AND TRADEMARK OFFICE
CERTIFICATE OF CORRECTION

| | | |
|---|---|---|
| PATENT NO. | : 11,876,653 B2 | |
| APPLICATION NO. | : 17/662294 | |
| DATED | : January 16, 2024 | |
| INVENTOR(S) | : Babich et al. | |

It is certified that error appears in the above-identified patent and that said Letters Patent is hereby corrected as shown below:

In the Claims

Column 35, Claim 14, Line 36, replace "the the" with --the--

Signed and Sealed this
Twenty-seventh Day of February, 2024

*Katherine Kelly Vidal*

Katherine Kelly Vidal
*Director of the United States Patent and Trademark Office*